United States Patent
Hubin et al.

(10) Patent No.: US 12,524,528 B2
(45) Date of Patent: Jan. 13, 2026

(54) COMPUTER-IMPLEMENTED METHODS AND APPARATUSES FOR DEFINING CONTEXT-BASED RULES FOR IDENTIFYING OCCURRENCES OF SITUATIONS IN SECURITY MONITORING SYSTEMS

(71) Applicant: GENETEC INC., Saint-Laurent (CA)

(72) Inventors: Mortimer Hubin, Laval (CA); Etienne St-Charles, Quebec (CA)

(73) Assignee: GENETEC INC., Saint-Laurent (CA)

( * ) Notice: Subject to any disclaimer, the term of this patent is extended or adjusted under 35 U.S.C. 154(b) by 559 days.

(21) Appl. No.: 17/976,223

(22) Filed: Oct. 28, 2022

(65) Prior Publication Data

US 2024/0143741 A1    May 2, 2024

(51) Int. Cl.
  G06F 21/55    (2013.01)
  G06V 10/22    (2022.01)

(52) U.S. Cl.
  CPC .......... *G06F 21/552* (2013.01); *G06V 10/235* (2022.01); *G06F 2221/034* (2013.01)

(58) Field of Classification Search
  CPC . G06N 3/04; G06N 3/08; G08B 21/02; G08B 5/22; H04W 4/90; G06F 15/16; G06F 21/55
  See application file for complete search history.

(56) References Cited

U.S. PATENT DOCUMENTS

| | | |
|---|---|---|
| 6,028,626 A | 2/2000 | Aviv |
| 8,885,929 B2 | 11/2014 | Ni et al. |
| 10,156,959 B2 | 12/2018 | Fulker et al. |
| 10,417,432 B2 | 9/2019 | Mahaffey et al. |
| 11,064,163 B2 | 7/2021 | Fernandes et al. |
| 11,170,633 B1 | 11/2021 | Hutz |
| 11,231,691 B2 | 1/2022 | Sinha et al. |
| 2019/0087058 A1* | 3/2019 | Leong ............ G06F 16/29 |
| 2019/0166457 A1* | 5/2019 | Lipowski ........ H04W 4/022 |
| 2019/0187882 A1* | 6/2019 | Johnson ........ G06Q 50/26 |
| 2023/0026521 A1* | 1/2023 | Gray ............ H04W 4/38 |
| 2023/0334966 A1* | 10/2023 | Ullah .......... G06V 20/52 |

* cited by examiner

*Primary Examiner* — Rayeez R Chowdhury

(57) ABSTRACT

A computer-implemented method, a device, and a computer readable storage medium are disclosed to enable the definition of rules for identifying occurrences of situations in a security system. The method is performed at an electronic device with access to a user interface. The method includes: obtaining indicia; accessing one or more information sources to retrieve contextual information based on the indicia; exposing, via the user interface, one or more condition-related user-selectable user interface elements; generating a rule for identifying occurrences of a situation based on one or more respective conditions corresponding to a selected subset of the one or more condition-related user-selectable user interface elements; and storing the rule in a rule database for use in monitoring for occurrences of the situation.

64 Claims, 21 Drawing Sheets

COMPUTER-IMPLEMENTED METHODS AND APPARATUSES FOR DEFINING CONTEXT-BASED RULES FOR IDENTIFYING OCCURRENCES OF SITUATIONS IN SECURITY MONITORING SYSTEMS

FIELD

The present disclosure relates generally to electronic devices and, more particularly, to a computer implemented method for defining rules for identifying occurrences of situations, particularly abnormal situations, in security monitoring platforms, such as a video management system (VMS).

BACKGROUND

Unified security monitoring platforms are a critical tool for maintaining safety in places such as buildings, campuses, airports and even entire neighborhoods. A typical security monitoring platform connects security systems, sensors, and data in a single interface that can be navigated and actioned by an operator.

In a security monitoring platform, an operator may view video security footage from numerous cameras and be able to monitor activities from other devices and sensors, such as access control door events from access controllers, audio from microphones, etc. However, when there are many cameras and other devices/sensors that need to be monitored, it is often not possible for the operator to be able to monitor everything. As such, security monitoring platform can be configured to alert the operator and/or others when an abnormal situation occurs. For example, when a person not authorized to access a given area of a facility attempts to badge-in at a door to access this restricted area, an access denied event can be presented to the operator along with the video footage of the security camera facing the door.

In some cases, the interface provides a map of the area of interest. As events arise, the security monitoring platform places them on the map and if the operator wishes to retrieve more detail about a particular event.

One issue with this conventional approach is that all the rules to detect the various abnormal situations need to be configured in advance, and when the operator notices a new abnormal situation not currently covered by the preconfigured rules, the operator would then need to configure a new rule for this new abnormal situation separate from its current monitoring interface. This conventional process for configuring rules for identifying abnormal situations has several disadvantages. Firstly, the process has the potential to clutter the visual display with overlapping windows to a point where the new windows may take up too much screen space and/or interfere with the map or may require rules to be configured in an interface that is separate from the monitoring interface. Secondly, the process is often a time-consuming task and may distract an operator from continuing to perform their monitoring activities for prolonged periods. Moreover, operator-configured rules in conventional security monitoring platforms can be sub-optimal because the configuration relies upon an operator's ability to identify and articulate the conditions or factors that are determinative of a given situation. Substantial skill and experience are required to navigate through the complex hierarchy of windows, search for the right information and run the right types of reports on that information; this makes it difficult and expensive to find qualified people to effectively operate the user interface of the security platform. As a result of one or more of the foregoing factors, operator-configured rules in conventional security monitoring platforms may be unduly narrow or broad, both of which can have negative consequences. Unduly narrow rules may return false-negatives (i.e., fail to identify an occurrence of an abnormal situation) and unduly broad rules can result in alarm fatigue due to false alarms triggered by false-positives.

Accordingly, there is a need for a security platform with a user interface that is easy to use, configure, and/or adapt for defining rules for identifying occurrences of situations and for defining action(s) to be taken when an occurrence of a situation is identified.

SUMMARY

The present disclosure describes a computer-implemented method for use in a security monitoring platform or an investigation tool that allows a user to quickly setup a new rule for triggering a notification when the user sees an abnormal situation in the graphical user interface (GUI). This setting up of the new rule is based on presenting in the GUI contextual data of the current situation and allowing the user to select (or deselect) this presented context data to indicate what is abnormal about the situation to setup the rule.

For example, when a user sees an abnormal situation in a live or pre-recorded video feed from a camera that the security system has failed to detect as being an abnormal situation because no rule has previously been configured for detecting this abnormal situation, the user may be able to right-click on the video and select an "abnormal situation" option in the pop-up box that appears. By way of another example, there could be an icon, e.g., beside a video window or in a window displaying an access granted or denied event, that when clicked by the user it indicates that there is an abnormal situation and the user would like to setup a new rule.

Once the user indicates via the GUI that there is an abnormal situation, the context data is presented to the user to allow the user to configure a new rule. The displayed context data can originate from various sources. The video can be processed to generate descriptive metadata of what is being displayed in the current videoframe, which can then be displayed as context data. Time/date information and/or location information can also be displayed as context data. Context data from other devices and/or sensors may be displayed (e.g., a gunshot notification from a gunshot detector, such as ShotSpotter™, an indication that a person is screaming from processing audio from a microphone, access control events from access control readers, user identification information, weather information, etc.).

By way of an example, an operator could be viewing live video of a facility, and notices that a delivery truck is parked at a loading dock on an evening on the weekend, yet no alert of notification was generated. The operator notices that this is an abnormal situation because the operator knows that delivery trucks should only be making deliveries during business hours during the weekdays. The context data includes keywords from processing the video, and "vehicle" and "truck" are displayed. The context data includes location information associated with the camera, and "back of building" is displayed. The context date includes time information, and "evening", "Saturday" and "weekend" is also displayed. The user then selects "truck", "back of building", "evening" and "weekend", and requests that a new rule be created that would generate a notification if an abnormal situation based on these selected conditions occurs again (i.e., a truck is detected in the camera facing the back of the building on an evening and/or a weekend). The user can optionally select how and to whom the notifications are delivered for when the new rule is triggered.

Such a method of retrieving and exposing contextual information as user-selectable conditions to configure rules for identifying situations in a security monitoring platform may enable the user to configure more targeted and effective rules in a short time. What is more, as the contextual information is exposed to the user, navigation through a complex hierarchy of windows or reports may be avoided. Thus, operator training and/or hiring costs may be saved as well.

Accordingly, a first aspect of the present disclosure provides a computer-implemented method for defining rules for identifying occurrences of situations in a security system. The method in accordance with the first aspect of the present disclosure is performed at an electronic device with access to a user interface and comprises: obtaining indicia; accessing one or more information sources to retrieve contextual information based on the indicia; exposing, via the user interface, one or more condition-related user-selectable user interface elements, the one or more condition-related user-selectable user interface elements corresponding to one or more respective conditions based on the contextual information; after receiving, via the user interface, selection of a subset of the one or more condition-related user-selectable user interface elements, generating a rule for identifying occurrences of a situation based on the one or more respective conditions corresponding to the selected subset of the one or more condition-related user-selectable user interface elements; and storing the rule in a rule database for use in monitoring for occurrences of the situation.

In some embodiments of the preceding aspect, the indicia comprises time-related indicia and location-related indicia.

In some embodiments of the preceding aspect, the method further comprises detecting user input in an area of the user interface, the user input indicating an occurrence of the situation, wherein obtaining the indicia comprises obtaining the indicia based on the user input.

In some embodiments of the preceding aspect, obtaining the indicia based on the user input comprises: identifying timestamp data associated with the user input; exposing, via the user interface, plural time-related user-selectable user interface elements based on the timestamp data associated with the user input, each time-related user-selectable user interface element corresponding to a different timeframe based on the timestamp data associated with the user input; and after receiving, via the user interface, selection of one of the time-related user-selectable user interface elements, assigning the timeframe corresponding to the selected one of the time-related user-selectable user interface elements as the time-related indicia.

In some embodiments of the preceding aspect, the timeframe corresponding to the selected one of the time-related user-selectable user interface elements is included as a condition in the rule for identifying occurrences of the situation.

In some embodiments of the preceding aspect, obtaining the indicia based on the user input further comprises: exposing, via the user interface, plural location-related user-selectable user interface elements, each location-related user-selectable user interface element corresponding to a different generalization of a region; and after receiving, via the user interface, selection of one of the location-related user-selectable user interface elements, assigning the region corresponding to the selected one of the location-related user-selectable user interface elements as the location-related indicia.

In some embodiments of the preceding aspect, the region corresponding to the selected one of the location-related user-selectable user interface elements is included as a condition in the rule for identifying occurrences of the situation.

In some embodiments of the preceding aspect, obtaining the indicia based on the user input comprises: identifying location data associated with the user input; exposing, via the user interface, plural location-related user-selectable user interface elements based on the location data associated with the user input, each location-related user-selectable user interface element corresponding to a different generalization of a region based on the location data associated with the user input; and after receiving, via the user interface, selection of one of the location-related user-selectable user interface elements, assigning the region corresponding to the selected one of the location-related user-selectable user interface elements as the location-related indicia.

In some embodiments of the preceding aspect, the region corresponding to the selected one of the location-related user-selectable user interface elements is included as a condition in the rule for identifying occurrences of the situation.

In some embodiments of the preceding aspect, obtaining the indicia based on the user input further comprises: exposing, via the user interface, plural time-related user-selectable user interface elements, each time-related user-selectable user interface element corresponding to a different timeframe; and after receiving, via the user interface, selection of one of the time-related user-selectable user interface elements, assigning the timeframe corresponding to the selected one of the time-related user-selectable user interface elements as the time-related indicia.

In some embodiments of the preceding aspect, the timeframe corresponding to the selected one of the time-related user-selectable user interface elements is included as a condition in the rule for identifying occurrences of the situation.

In some embodiments of the preceding aspect, the user input indicating the occurrence of the situation comprises one or more of selection, via the user interface, of one or more events and selection, via the user interface, of one or more entities.

In some embodiments of the preceding aspect, the one or more entities comprises at least one of a security camera, an access point, a person, a videoconference camera, a building zone, a parking lot, a microphone, a telephone, and a user note.

In some embodiments of the preceding aspect, the one or more events comprises at least one of an access granted event, a glass broken event, a license plate hit event, an unattended package event, and an interlock access denied event.

In some embodiments of the preceding aspect, the user input indicating the occurrence of the situation comprises plural selections via the user interface, the plural selections comprising one or more of: selections of at least two entities; selections of one entity at different times; selections of at least two events; and selections of at least one event and at least one entity.

In some embodiments of the preceding aspect: obtaining indicia based on the user input comprises obtaining a respective subset of indicia for each selection of an entity or an event; accessing one or more information sources to retrieve contextual information based on the indicia comprises, for each respective subset of indicia, accessing one or more information sources to retrieve a respective subset of contextual information based on the respective subset of indicia; and exposing one or more condition-related user-selectable user interface elements comprises processing the respective subsets of contextual information to extract similarities in the respective subsets of contextual information, and exposing, via the user interface, at least one condition-related user-selectable user interface element corresponding to a condition based on one or more extracted similarities in the respective subsets of contextual information for two or more of the plural selections.

In some embodiments of the preceding aspect, the contextual information comprises meta-data extracted from data associated with at least one entity or event.

In some embodiments of the preceding aspect, the method further comprises exposing, via the user interface, logic-related user-selectable user interface elements, each logic-related user-selectable user interface element corresponding to a respective logical operation, the logic-related user-selectable user interface elements being selectable to define logical relations between conditions corresponding to the condition-related user-selectable user interface elements to define the rule for identifying occurrences of the situation.

In some embodiments of the preceding aspect, receiving selection of the subset of the one or more condition-related user-selectable user interface elements comprises receiving, via the user interface, selection of at least two of the one or more condition-related user-selectable user interface elements and selection of at least one of the logic-related user-selectable user interface elements to define the rule for identifying occurrences of the situation.

In some embodiments of the preceding aspect: detecting user input indicating an occurrence of a situation comprises detecting user input indicating a latest occurrence of a situation for which a pre-existing rule for identifying occurrences of the situation has been defined; obtaining indicia based on the user input comprises obtaining indicia related to the latest occurrence of the situation; accessing one or more information sources to retrieve contextual information based on the indicia comprises accessing one or more information sources to retrieve contextual information related to the latest occurrence of the situation based on the indicia; and exposing one or more condition-related user-selectable user interface elements comprises exposing, via the user interface, one or more condition-related user-selectable user interface elements corresponding to respective conditions based on the contextual information related to the latest occurrence of the situation to facilitate refinement of the pre-existing rule for identifying occurrences of the situation.

In some embodiments of the preceding aspect, exposing one or more condition-related user-selectable user interface elements comprises: exposing, via the user interface, one or more condition category-related user-selectable user interface elements, each condition category-related user-selectable user interface element corresponding to a respective category of conditions; and after receiving, via the user interface, selection of one of the one or more condition category-related user-selectable user interface elements, exposing, via the user interface, one or more condition-related user-selectable user interface elements corresponding to respective conditions within the respective category of conditions corresponding to the selected one of the one or more condition category-related user-selectable user interface element.

In some embodiments of the preceding aspect, accessing one or more information sources to retrieve contextual information based on the indicia comprises accessing plural information sources, the plural information sources comprising: at least one information source internal to the security system to retrieve contextual information based on internal data collected in operation of the security system; and at least one information source external to the security system to retrieve contextual information based on external data that is independent of operation of the security system.

In some embodiments of the preceding aspect, the at least one information source external to the security system comprises one or more of an information source providing weather condition information, an information source providing social media information, an information source providing news and current events information, and an information source providing traffic information.

In some embodiments of the preceding aspect, the method further comprises: receiving, via the user interface, an indication of one or more tags to be triggered when an occurrence of the situation is identified, each tag being associated with a respective subset of one or more actions to perform if the tag is triggered; and wherein, storing the rule in the rule database for use in monitoring for occurrences of the situation comprises storing the one or more tags in association with the rule such that identifying an occurrence of the situation based on the rule triggers the one or more tags associated with the rule.

In some embodiments of the preceding aspect, for at least one of the one or more tags, the respective subset of one or more actions to perform if the tag is triggered includes one or more of raising an alarm and sending a notification.

In some embodiments of the preceding aspect, the method further comprises: receiving, via the user interface, an indication of one or more tags to be triggered when a specific condition included in the definition of the rule for identifying an occurrence of the situation is present when an occurrence of the situation is identified, each tag to be triggered when the specific condition is present being associated with a respective subset of one or more actions to perform if the tag is triggered, wherein, storing the rule in the rule database for use in monitoring for occurrences of the situation comprises storing the one or more tags in association with the specific condition included in the definition of the rule such that identifying an occurrence of the situation in which the specific condition is present based on the rule triggers the one or more tags associated with the specific condition.

In some embodiments of the preceding aspect, wherein the situation is a first situation, the method further comprises: identifying an occurrence of a similar second situation having some but less than all conditions in common with the rule defined for identifying occurrences of the first situation; and in response to identifying the occurrence of the similar second situation, exposing, via the user interface, the occurrence of the similar second situation.

In some embodiments of the preceding aspect, the method further comprises: identifying an occurrence of the situation based on the rule stored in the rule database; and in response to identifying the occurrence of the situation, triggering one or more actions.

In some embodiments of the preceding aspect, identifying an occurrence of the situation based on the rule stored in the rule database comprises: applying, using a rule engine, the rule stored in the rule database to live video data from at least one camera to determine whether the rule for identifying an occurrence of the situation has been met; and identifying the occurrence of the situation based on a result of applying the rule to the live video data.

In some embodiments of the preceding aspect, applying the rule to the live video data comprises: extracting meta-data from the live video data, wherein the meta-data extracted from the live video corresponds to at least one of the one or more respective conditions on which the rule for identifying occurrences of the situation is based; and applying, using the rule engine, the rule to the extracted meta-data to determine whether the rule for identifying an occurrence of the situation has been met.

A second aspect of the present disclosure provides a device. The device comprises: a user interface; one or more processors; memory; and one or more programs for defining rules for identifying occurrences of situations in a security system. The one or more programs are stored in the memory and configured to be executed by the one or more processors. The programs include: instructions for obtaining indicia; instructions for accessing one or more information sources to retrieve contextual information based on the indicia; instructions for exposing, via the user interface, one or more condition-related user-selectable user interface elements, the one or more condition-related user-selectable user interface elements corresponding to one or more respective conditions based on the contextual information; instructions for, after receiving, via the user interface, selection of a subset of the one or more condition-related user-selectable user interface elements, generating a rule for identifying occurrences of a situation based on the one or more respective conditions corresponding to the selected subset of the one or more condition-related user-selectable user interface elements; and instructions for storing the rule in a rule database for use in monitoring for occurrences of the situation.

In some embodiments of the preceding aspect, the indicia comprises time-related indicia and location-related indicia.

In some embodiments of the preceding aspect, the one or more programs further include instructions for detecting user input in an area of the user interface, the user input indicating an occurrence of the situation, wherein the instructions for obtaining the indicia comprises instructions for obtaining the indicia based on the user input.

In some embodiments of the preceding aspect, the instructions for obtaining the indicia based on the user input comprises: instructions for identifying timestamp data associated with the user input; instructions for exposing, via the user interface, plural time-related user-selectable user interface elements based on the timestamp data associated with the user input, each time-related user-selectable user interface element corresponding to a different timeframe based on the timestamp data associated with the user input; and instructions for, after receiving, via the user interface, selection of one of the time-related user-selectable user interface elements, assigning the timeframe corresponding to the selected one of the time-related user-selectable user interface elements as the time-related indicia.

In some embodiments of the preceding aspect, the timeframe corresponding to the selected one of the time-related user-selectable user interface elements is included as a condition in the rule for identifying occurrences of the situation.

In some embodiments of the preceding aspect, the instructions for obtaining the indicia based on the user input further comprise: instructions for exposing, via the user interface, plural location-related user-selectable user interface elements, each location-related user-selectable user interface element corresponding to a different generalization of a region; and instructions for, after receiving, via the user interface, selection of one of the location-related user-selectable user interface elements, assigning the region corresponding to the selected one of the location-related user-selectable user interface elements as the location-related indicia.

In some embodiments of the preceding aspect, the region corresponding to the selected one of the location-related user-selectable user interface elements is included as a condition in the rule for identifying occurrences of the situation.

In some embodiments of the preceding aspect, the instructions for obtaining the indicia based on the user input comprises: instructions for identifying location data associated with the user input; instructions for exposing, via the user interface, plural location-related user-selectable user interface elements based on the location data associated with the user input, each location-related user-selectable user interface element corresponding to a different generalization of a region based on the location data associated with the user input; and instructions for, after receiving, via the user interface, selection of one of the location-related user-selectable user interface elements, assigning the region corresponding to the selected one of the location-related user-selectable user interface elements as the location-related indicia.

In some embodiments of the preceding aspect, the region corresponding to the selected one of the location-related user-selectable user interface elements is included as a condition in the rule for identifying occurrences of the situation.

In some embodiments of the preceding aspect, the instructions for obtaining the indicia based on the user input further comprises: instructions for exposing, via the user interface, plural time-related user-selectable user interface elements, each time-related user-selectable user interface element corresponding to a different timeframe; and instructions for, after receiving, via the user interface, selection of one of the time-related user-selectable user interface elements, assigning the timeframe corresponding to the selected one of the time-related user-selectable user interface elements as the time-related indicia.

In some embodiments of the preceding aspect, the timeframe corresponding to the selected one of the time-related user-selectable user interface elements is included as a condition in the rule for identifying occurrences of the situation.

In some embodiments of the preceding aspect, the user input indicating the occurrence of the situation comprises one or more of selection, via the user interface, of one or more events and selection, via the user interface, of one or more entities.

In some embodiments of the preceding aspect, the one or more entities comprises at least one of a security camera, an access point, a person, a videoconference camera, a building zone, a parking lot, a microphone, a telephone, and a user note.

In some embodiments of the preceding aspect, the one or more events comprises at least one of an access granted event, a glass broken event, a license plate hit event, an unattended package event, and an interlock access denied event.

In some embodiments of the preceding aspect, the user input indicating the occurrence of the situation comprises plural selections via the user interface, the plural selections comprising one or more of: selections of at least two entities; selections of one entity at different times; selections of at least two events; and selections of at least one event and at least one entity.

In some embodiments of the preceding aspect: the instructions for obtaining indicia based on the user input comprise: instructions for obtaining a respective subset of indicia for each selection of an entity or an event; the instructions for instructions for accessing one or more information sources to retrieve contextual information based on the indicia comprise instructions for, for each respective subset of indicia, accessing one or more information sources to retrieve a respective subset of contextual information based on the respective subset of indicia; and the instructions for exposing one or more condition-related user-selectable user interface elements comprise instructions for processing the respective subsets of contextual information to extract similarities in the respective subsets of contextual information, and instructions for exposing, via the user interface, at least one condition-related user-selectable user interface element corresponding to a condition based on one or more extracted similarities in the respective subsets of contextual information for two or more of the plural selections.

In some embodiments of the preceding aspect, the contextual information comprises meta-data extracted from data associated with at least one entity or event.

In some embodiments of the preceding aspect, the one or more programs further include instructions for exposing, via the user interface, logic-related user-selectable user interface elements, each logic-related user-selectable user interface element corresponding to a respective logical operation, the logic-related user-selectable user interface elements being selectable to define logical relations between conditions corresponding to the condition-related user-selectable user interface elements to define the rule for identifying occurrences of the situation.

In some embodiments of the preceding aspect, the instructions for receiving selection of the subset of the one or more condition-related user-selectable user interface elements comprise instructions for receiving, via the user interface, selection of at least two of the one or more condition-related user-selectable user interface elements and selection of at least one of the logic-related user-selectable user interface elements to define the rule for identifying occurrences of the situation.

In some embodiments of the preceding aspect: the instructions for detecting user input indicating an occurrence of a situation comprise instructions for detecting user input indicating a latest occurrence of a situation for which a pre-existing rule for identifying occurrences of the situation has been defined; the instructions for obtaining indicia based on the user input comprise instructions for obtaining indicia related to the latest occurrence of the situation; the instructions for accessing one or more information sources to retrieve contextual information based on the indicia comprise instructions for accessing one or more information sources to retrieve contextual information related to the latest occurrence of the situation based on the indicia; and the instructions for exposing one or more condition-related user-selectable user interface elements comprise instructions for exposing, via the user interface, one or more condition-related user-selectable user interface elements corresponding to respective conditions based on the contextual information related to the latest occurrence of the situation to facilitate refinement of the pre-existing rule for identifying occurrences of the situation.

In some embodiments of the preceding aspect, the instructions for exposing one or more condition-related user-selectable user interface elements comprise: instructions for exposing, via the user interface, one or more condition category-related user-selectable user interface elements, each condition category-related user-selectable user interface element corresponding to a respective category of conditions; and instructions for, after receiving, via the user interface, selection of one of the one or more condition category-related user-selectable user interface elements, exposing, via the user interface, one or more condition-related user-selectable user interface elements corresponding to respective conditions within the respective category of conditions corresponding to the selected one of the one or more condition category-related user-selectable user interface element.

In some embodiments of the preceding aspect, the instructions for accessing one or more information sources to retrieve contextual information based on the indicia comprise instructions for accessing plural information sources, the plural information sources comprising at least one information source internal to the security system to retrieve contextual information based on internal data collected in operation of the security system; and at least one information source external to the security system to retrieve contextual information based on external data that is independent of operation of the security system.

In some embodiments of the preceding aspect, the at least one information source external to the security system comprises one or more of an information source providing weather condition information, an information source providing social media information, an information source providing news and current events information, and an information source providing traffic information.

In some embodiments of the preceding aspect, the one or more programs further include: instructions for receiving, via the user interface, an indication of one or more tags to be triggered when an occurrence of the situation is identified, each tag being associated with a respective subset of one or more actions to perform if the tag is triggered; and wherein, the instructions for storing the rule in the rule database for use in monitoring for occurrences of the situation comprise instructions for storing the one or more tags in association with the rule such that identifying an occurrence of the situation based on the rule triggers the one or more tags associated with the rule.

In some embodiments of the preceding aspect, for at least one of the one or more tags, the respective subset of one or more actions to perform if the tag is triggered includes one or more of raising an alarm and sending a notification.

In some embodiments of the preceding aspect, the one or more programs further include: instructions for receiving, via the user interface, an indication of one or more tags to be triggered when a specific condition included in the definition of the rule for identifying an occurrence of the situation is present when an occurrence of the situation is identified, each tag to be triggered when the specific condition is present being associated with a respective subset of one or more actions to perform if the tag is triggered, wherein, the instructions for storing the rule in the rule database for use in monitoring for occurrences of the situation comprise instructions for storing the one or more tags in association with the specific condition included in the definition of the rule such that identifying an occurrence of the situation in which the specific condition is present based on the rule triggers the one or more tags associated with the specific condition.

In some embodiments of the preceding aspect, the situation is a first situation and the one or more programs further include: instructions for identifying an occurrence of a similar second situation having some but less than all conditions in common with the rule defined for identifying occurrences of the first situation; and instructions for, in response to identifying the occurrence of the similar second situation, exposing, via the user interface, the occurrence of the similar second situation.

In some embodiments of the preceding aspect, the one or more programs further include: instructions for identifying an occurrence of the situation based on the rule stored in the rule database; and in response to identifying the occurrence of the situation, triggering one or more actions.

In some embodiments of the preceding aspect, the instructions for identifying an occurrence of the situation based on the rule stored in the rule database comprise: instructions for applying the rule stored in the rule database to live video data from at least one camera to determine whether the rule for identifying an occurrence of the situation has been met; and instructions for identifying the occurrence of the situation based on a result of applying the rule to the live video data.

In some embodiments of the preceding aspect, the instructions for applying the rule to the live video data comprise: instructions for accessing meta-data from the live video data, wherein the meta-data corresponds to at least one of the one or more respective conditions on which the rule for identifying occurrences of the situation is based; and instructions for applying the rule to the meta-data to determine whether the rule for identifying an occurrence of the situation has been met.

A third aspect of the present disclosure provides a computer readable storage medium. The computer readable storage medium has stored therein instructions for defining rules for identifying occurrences of situations in a security system, which when executed by a device having access to a user interface, cause the device to: obtain indicia; access one or more information sources to retrieve contextual information based on the indicia; expose, via the user interface, one or more condition-related user-selectable user interface elements, the one or more condition-related user-selectable user interface elements corresponding to one or more respective conditions based on the contextual information; after receiving, via the user interface, selection of a subset of the one or more condition-related user-selectable user interface elements, generate a rule for identifying occurrences of a situation based on the one or more respective conditions corresponding to the selected subset of the one or more condition-related user-selectable user interface elements; and store the rule in a rule database for use in monitoring for occurrences of the situation.

In some embodiments of the preceding aspect, the indicia comprises time-related indicia and location-related indicia.

In some embodiments of the preceding aspect, the instructions further comprise instructions that when executed by the device cause the device to detect user input in an area of the user interface, the user input indicating an occurrence of the situation, wherein obtaining the indicia comprises obtaining the indicia based on the user input.

In some embodiments of the preceding aspect, the instructions that when executed by the device cause the device to obtain the indicia based on the user input comprise instructions that when executed by the device cause the device to: identify timestamp data associated with the user input; expose, via the user interface, plural time-related user-selectable user interface elements based on the timestamp data associated with the user input, each time-related user-selectable user interface element corresponding to a different timeframe based on the timestamp data associated with the user input; and after receiving, via the user interface, selection of one of the time-related user-selectable user interface elements, assign the timeframe corresponding to the selected one of the time-related user-selectable user interface elements as the time-related indicia.

In some embodiments of the preceding aspect, the timeframe corresponding to the selected one of the time-related user-selectable user interface elements is included as a condition in the rule for identifying occurrences of the situation.

In some embodiments of the preceding aspect, the instructions that when executed by the device cause the device to obtain the indicia based on the user input further comprise instructions that when executed by the device cause the device to: expose, via the user interface, plural location-related user-selectable user interface elements, each location-related user-selectable user interface element corresponding to a different generalization of a region; and after receiving, via the user interface, selection of one of the location-related user-selectable user interface elements, assign the region corresponding to the selected one of the location-related user-selectable user interface elements as the location-related indicia.

In some embodiments of the preceding aspect, the region corresponding to the selected one of the location-related user-selectable user interface elements is included as a condition in the rule for identifying occurrences of the situation.

In some embodiments of the preceding aspect, the instructions that when executed by the device cause the device to obtain the indicia based on the user input comprise instructions that when executed by the device cause the device to: identify location data associated with the user input; expos, via the user interface, plural location-related user-selectable user interface elements based on the location data associated with the user input, each location-related user-selectable user interface element corresponding to a different generalization of a region based on the location data associated with the user input; and after receiving, via the user interface, selection of one of the location-related user-selectable user interface elements, assign the region corresponding to the selected one of the location-related user-selectable user interface elements as the location-related indicia.

In some embodiments of the preceding aspect, the region corresponding to the selected one of the location-related user-selectable user interface elements is included as a condition in the rule for identifying occurrences of the situation.

In some embodiments of the preceding aspect, the instructions that when executed by the device cause the device to obtain the indicia based on the user input further comprise instructions that when executed by the device cause the device to: expose, via the user interface, plural time-related user-selectable user interface elements, each time-related user-selectable user interface element corresponding to a different timeframe; and after receiving, via the user interface, selection of one of the time-related user-selectable user interface elements, assign the timeframe corresponding to the selected one of the time-related user-selectable user interface elements as the time-related indicia.

In some embodiments of the preceding aspect, the timeframe corresponding to the selected one of the time-related user-selectable user interface elements is included as a condition in the rule for identifying occurrences of the situation.

In some embodiments of the preceding aspect, the user input indicating the occurrence of the situation comprises one or more of selection, via the user interface, of one or more events and selection, via the user interface, of one or more entities.

In some embodiments of the preceding aspect, the one or more entities comprises at least one of a security camera, an access point, a person, a videoconference camera, a building zone, a parking lot, a microphone, a telephone, and a user note.

In some embodiments of the preceding aspect, the one or more events comprises at least one of an access granted event, a glass broken event, a hotlist hit event, an unattended package event, and an interlock access denied event. In some embodiments of the preceding aspect, the user input indicating the occurrence of the situation comprises plural selections via the user interface, the plural selections comprising one or more of: selections of at least two entities; selections of one entity at different times; selections of at least two events; and selections of at least one event and at least one entity.

In some embodiments of the preceding aspect: the instructions that when executed by the device cause the device to obtain indicia based on the user input comprise instructions that when executed by the device cause the device to obtain a respective subset of indicia for each selection of an entity or an event; the instructions that when executed by the device cause the device to access one or more information sources to retrieve contextual information based on the indicia comprise instructions that when executed by the device cause the device to, for each respective subset of indicia, access one or more information sources to retrieve a respective subset of contextual information based on the respective subset of indicia; and the instructions that when executed by the device cause the device to expose one or more condition-related user-selectable user interface elements comprise instructions that when executed by the device cause the device to process the respective subsets of contextual information to extract similarities in the respective subsets of contextual information, and exposing, via the user interface, at least one condition-related user-selectable user interface element corresponding to a condition based on one or more extracted similarities in the respective subsets of contextual information for two or more of the plural selections.

In some embodiments of the preceding aspect, the contextual information comprises meta-data extracted from data associated with at least one entity or event.

In some embodiments of the preceding aspect, the instructions further comprise instructions that when executed by the device cause the device to: expose, via the user interface, logic-related user-selectable user interface elements, each logic-related user-selectable user interface element corresponding to a respective logical operation, the logic-related user-selectable user interface elements being selectable to define logical relations between conditions corresponding to the condition-related user-selectable user interface elements to define the rule for identifying occurrences of the situation.

In some embodiments of the preceding aspect, the instructions that when executed by the device cause the device to receive selection of the subset of the one or more condition-related user-selectable user interface elements comprise instructions that when executed by the device cause the device to receive, via the user interface, selection of at least two of the one or more condition-related user-selectable user interface elements and selection of at least one of the logic-related user-selectable user interface elements to define the rule for identifying occurrences of the situation.

In some embodiments of the preceding aspect: the instructions that when executed by the device cause the device to detect user input indicating an occurrence of a situation comprise instructions that when executed by the device cause the device to detect user input indicating a latest occurrence of a situation for which a pre-existing rule for identifying occurrences of the situation has been defined; the instructions that when executed by the device cause the device to obtain indicia based on the user input comprise instructions that when executed by the device cause the device to obtain indicia related to the latest occurrence of the situation; the instructions that when executed by the device cause the device to access one or more information sources to retrieve contextual information based on the indicia comprise instructions that when executed by the device cause the device to access one or more information sources to retrieve contextual information related to the latest occurrence of the situation based on the indicia; and the instructions that when executed by the device cause the device to expose one or more condition-related user-selectable user interface elements comprise instructions that when executed by the device cause the device to expose, via the user interface, one or more condition-related user-selectable user interface elements corresponding to respective conditions based on the contextual information related to the latest occurrence of the situation to facilitate refinement of the pre-existing rule for identifying occurrences of the situation.

In some embodiments of the preceding aspect, the instructions that when executed by the device cause the device to expose one or more condition-related user-selectable user interface elements comprise instructions that when executed by the device cause the device to: expose, via the user interface, one or more condition category-related user-selectable user interface elements, each condition category-related user-selectable user interface element corresponding to a respective category of conditions; and after receiving, via the user interface, selection of one of the one or more condition category-related user-selectable user interface elements, expose, via the user interface, one or more condition-related user-selectable user interface elements corresponding to respective conditions within the respective category of conditions corresponding to the selected one of the one or more condition category-related user-selectable user interface element.

In some embodiments of the preceding aspect, the instructions that when executed by the device cause the device to access one or more information sources to retrieve contextual information based on the indicia comprise instructions that when executed by the device cause the device to access plural information sources, the plural information sources comprising: at least one information source internal to the security system to retrieve contextual information based on internal data collected in operation of the security system; and at least one information source external to the security system to retrieve contextual information based on external data that is independent of operation of the security system.

In some embodiments of the preceding aspect, the at least one information source external to the security system comprises one or more of an information source providing weather condition information, an information source providing social media information, an information source providing news and current events information, and an information source providing traffic information.

In some embodiments of the preceding aspect, the instructions further comprise instructions that when executed by the device cause the device to: receive, via the user interface, an indication of one or more tags to be triggered when an occurrence of the situation is identified, each tag being associated with a respective subset of one or more actions to perform if the tag is triggered; and wherein, the instructions that when executed by the device cause the device to store the rule in the rule database for use in monitoring for occurrences of the situation comprise instructions that when executed by the device cause the device to store the one or more tags in association with the rule such that identifying an occurrence of the situation based on the rule triggers the one or more tags associated with the rule.

In some embodiments of the preceding aspect, for at least one of the one or more tags, the respective subset of one or more actions to perform if the tag is triggered includes one or more of raising an alarm and sending a notification.

In some embodiments of the preceding aspect, the instructions further comprise instructions that when executed by the device cause the device to: receive, via the user interface, an indication of one or more tags to be triggered when a specific condition included in the definition of the rule for identifying an occurrence of the situation is present when an occurrence of the situation is identified, each tag to be triggered when the specific condition is present being associated with a respective subset of one or more actions to perform if the tag is triggered, wherein, the instructions that when executed by the device cause the device to store the rule in the rule database for use in monitoring for occurrences of the situation comprise instructions that when executed by the device cause the device to store the one or more tags in association with the specific condition included in the definition of the rule such that identifying an occurrence of the situation in which the specific condition is present based on the rule triggers the one or more tags associated with the specific condition.

In some embodiments of the preceding aspect, the situation is a first situation, and the instructions further comprise instructions that when executed by the device cause the device to: identify an occurrence of a similar second situation having some but less than all conditions in common with the rule defined for identifying occurrences of the first situation; and in response to identifying the occurrence of the similar second situation, expose, via the user interface, the occurrence of the similar second situation.

In some embodiments of the preceding aspect, the instructions further comprise instructions that when executed by the device cause the device to: identify an occurrence of the situation based on the rule stored in the rule database; and in response to identifying the occurrence of the situation, trigger one or more actions.

In some embodiments of the preceding aspect, the instructions that when executed by the device cause the device to identify an occurrence of the situation based on the rule stored in the rule database comprise instructions that when executed by the device cause the device to: apply the rule stored in the rule database to live video data from at least one camera to determine whether the rule for identifying an occurrence of the situation has been met; and identify the occurrence of the situation based on a result of applying the rule to the live video data.

In some embodiments of the preceding aspect, the instructions that when executed by the device cause the device to apply the rule to the live video data comprise instructions that when executed by the device cause the device to: access meta-data from the live video data, wherein the meta-data corresponds to at least one of the one or more respective conditions on which the rule for identifying occurrences of the situation is based; and apply the rule to the meta-data to determine whether the rule for identifying an occurrence of the situation has been met

BRIEF DESCRIPTION OF THE DRAWINGS

Reference will now be made, by way of example, to the accompanying drawings which show example embodiments of the present application, and in which.

Similar reference numerals may have been used in different figures to denote similar components.

Figure 1A:
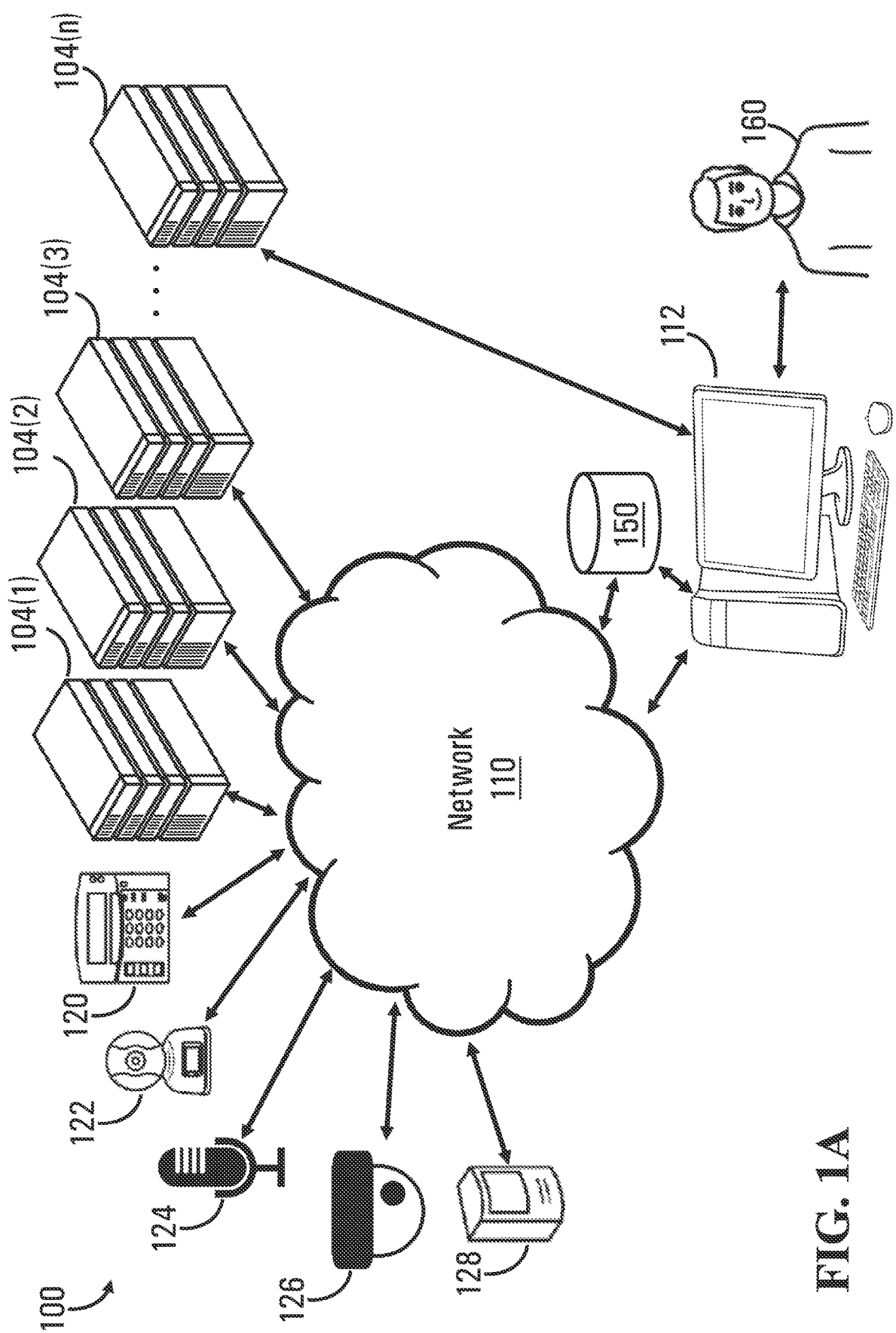
FIG. 1A is a schematic diagram of an example security system architecture in accordance with example embodiments.

In the drawings, embodiments are illustrated by way of example. It is to be expressly understood that the description and drawings are only for purposes of illustrating certain embodiments and are an aid for understanding. They are not intended to be a definition of the limits of the invention.

DESCRIPTION OF EXAMPLE EMBODIMENTS

The present disclosure is made with reference to the accompanying drawings, in which certain non-limiting embodiments are shown. However, the description should not be construed as being limited to the embodiments set forth herein. Rather, these embodiments are provided as examples. Like numbers refer to like elements/components throughout. Separate boxes or illustrated separation of functional elements or modules of illustrated systems and devices does not necessarily require physical separation of such functions or modules, as communication between such elements can occur by way of messaging, function calls, shared memory space, and so on, without any such physical separation. As such, functions or modules need not be implemented in physically or logically separated platforms, although they may be illustrated separately for ease of explanation herein. Different devices can have different designs, such that while some devices implement some functions in fixed function hardware, other devices can implement such functions in a programmable processor with code obtained from a machine readable medium.

I. Security System Architecture

The disclosed methods and systems may be used in various applications, including security management of locations such as office buildings, bus terminals, train stations, airports, schools, campuses, stadiums, neighborhoods or entire cities, to name a few non-limiting examples.

FIG. 1A is a schematic diagram illustrating an example security system architecture 100 suitable for operating an electronic device 112 in accordance with a non-limiting example of the present disclosure. The security system architecture 100 comprises network 110, which can include a public data network such as the internet. The electronic device 112 is connected to the network 110, enabling the electronic device 112 to access one or more services through the network 110. The security system architecture 100 can include multiple different types of communication networks (not shown) in communication with the electronic device 112 and each of these communication networks can be connected directly or indirectly to the network 110.

In some applications, data related to one or more services (e.g., data that may be used as "contextual information" based on "indicia", as discussed below) may be stored within respective information sources 104(1)-104(3) accessible over the network 110. Non-limiting examples of services for which data may be stored in one or more of the information sources 104 could include monitoring service, sensing services, communication services and/or access control services. For example, data stored in the information sources 104 could include data collected from an access control device (e.g., a card reader or keypad 120), a communication device (e.g., a video conference camera 122), a sensing device (e.g., a microphone 124 or a motion sensor 128) and/or a monitoring device (e.g., a security camera 126).

The information sources 104(1)-104(3) may be reachable over the network 110 in various non-limiting ways. For example, an information source 104(1) may establish a wired link with the network 110 such that the data can be accessed over the network 110; an information source 104(2) communicates with the network 110 via cellular communication links; and an information source 104(3) may be coupled with the network 110 by using Wi-Fi wireless network which conforms to IEEE 802.11x standards (sometimes referred to as Wi-Fi®, although in other examples, other communication protocols may be used for the Wi-Fi wireless network).

In some applications, the electronic device 112 may establish any suitable communication link (e.g., wired communication link, cellular network communication link, or Wi-Fi wireless communication link) with the network 110 through which the respective information sources 104(1)-104(3) are accessed to retrieve the contextual information. In some applications, one or more of the information sources 104 could be "external" to the security system itself. For example, in some applications the electronic device 112 may establish a communication link with the network 110 to access one or more of the information sources 104 to retrieve contextual information based on external data that is independent of operation of the security system, such as weather condition information, an information source providing social media information, an information source providing news and current events information, and an information source providing traffic information.

In some applications, the electronic device 112 may also have direct access to one or more such services by local or peer-to-peer (P2P) communication with a local information source 104(n), which also may store data that may be used as contextual information and/or that can be processed to extract or otherwise obtain the contextual information, as described below. With respect to the P2P communication link established between the electronic device 112 and the local information source 104(n), the local information source 104(n) and the electronic device 112 may be end-hosts (also referred to as peers) to establish a direct local link in an ad-hoc manner. That means, the information source 104(n) and the electronic device 112 are both suppliers and consumers of resources (e.g., general documents, audio, video, data records), in contrast to traditional client-server architecture in which the consumption and supply of resources is segregated. Various protocols, such as Advanced peer-to-peer networking (APPN), BitTorrent, Direct Connect, FastTrack, and so on, may be applied by the P2P communication.

The information sources 104(1)-104(n) are collectively referred to as information sources 104 and in some applications, the information sources 104 may also be referred to as servers. It should be appreciated that although the drawing shows three network-connected information sources 104(1)-104(3) and one directly connected information source 104(n), there is no particular limitation on the number of information sources of either kind.

In some cases, information sources 104 may store contextual information that can be retrieved based on indicia, such as time-related indicia and/or location-related indicia, and the electronic device 112 may then access a storage unit(s) at one or more of the information sources 104 via the network 110 in order to retrieve contextual information and/or to retrieve data from which contextual information can be extracted or otherwise obtained, as discussed below. However, in some examples, some of the information stored by the information sources 104 may be stored additionally or alternatively at the electronic device 112 itself. This is illustrative and not intended to be limiting. In other possible configurations, the electronic device 112 may access any other entity of the security system architecture 100 (even those not shown) to retrieve contextual information. For example, in some implementations, the electronic device 112 may access and retrieve contextual information from one or more access control devices (e.g., card reader or keypad 120), one or more communication devices (e.g., video conference camera 122), one or more sensing devices (e.g., microphone 124 and motion sensor 128) and/or one or more monitoring devices (e.g., security camera 126).

The security system architecture 100 further comprises a rule database 150 for storing rules for identifying occurrences of situations in the security system, as discussed below. In some applications, rule database 150 may be implemented as part of a data storage unit at electronic device 112. In other applications, rule database 150 may in addition or instead be implemented separately from electronic device 112 and may be accessible by electronic device 112 via communication network 110 or peer-to-peer communication.

In the embodiment of FIG. 1A, the electronic device 112 may be any component (or collection of components) capable of carrying out a graphical user interface (GUI) and communicating with the information sources 104 and the rule database 150. To this end, the electronic device 112 could be a desktop console used by a user 160, but it could also be a tablet, a laptop or even a mobile phone. In various non-limiting embodiments, the user 160 may be an administrator, a work area supervisor or a member of law enforcement, for example.

A graphical user interface (GUI) can be defined as functionality for displaying information for visualization by a user, receiving input from the user pertaining to the displayed information, associating the user input to the displayed information and taking an action based on the displayed information associated with the user input. In some cases, a GUI can be implemented by a combination of a display, a mouse/keyboard and an input/output controller, whereas in other cases, a GUI can be implemented by a touchscreen and touchscreen controller. Other embodiments are of course possible.

Figure 1B:
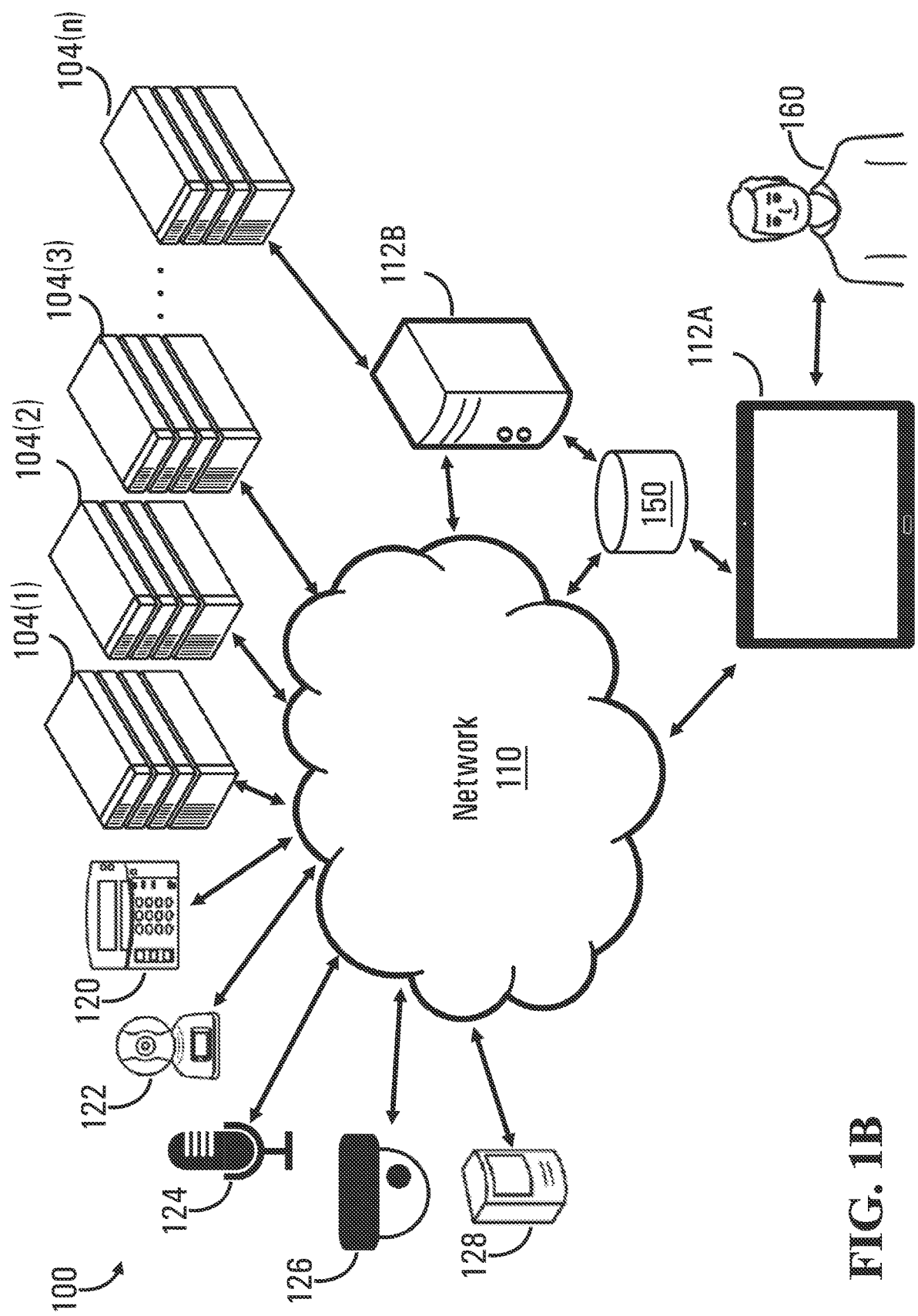
FIG. 1B is a schematic diagram of an example security system architecture in accordance with alternative example embodiments.

While in the embodiment of FIG. 1A, the functions of implementing the GUI and communicating with the information sources 104 are carried out by the same electronic device 112, this functionality can be distributed among separate devices. Accordingly, FIG. 1B is a schematic diagram illustrating an example security system architecture 100 in accordance with another non-limiting embodiment in which an electronic device 112A, which in this example is a tablet, implements the GUI and an electronic device 112B, which in this example is a server, communicates with the network information sources 104. For simplicity, the electronic devices 112A and 112B can be collectively referred to as an electronic device 112 in the below description. As shown in FIG. 1B, in this implementation the rule database 150 may be accessible by electronic device 112B directly or through network 110. Similar to the electronic device 112 shown in FIG. 1A, in the implementation shown in FIG. 1B the electronic device 112B may access and retrieve contextual information from one or more of the information sources 104 and/or one or more access control devices (e.g., card reader or keypad 120), one or more communication devices (e.g., video conference camera 122), one or more sensing devices (e.g., microphone 124 and motion sensor 128) and/or one or more monitoring devices (e.g., security camera 126). In this implementation, the relationship between electronic device 112A and electronic device 112 may be that of a client-server relationship, whereby electronic device 112B acts as a server that performs some portion of the processing functions of the computer-implemented methods of the present disclosure and the electronic device 112A interfaces with the electronic device 112B as a "client". For example, in one non-limiting implementation, electronic device 112A may implement the user interface through which the user interacts (e.g., to indicate an abnormal situation, initiate a rule definition process, select conditions based on displayed context information to setup a rule for identifying occurrences of the situation, etc.) and the electronic device 112B may implement data retrieval and processing steps (e.g., obtaining the user's selections, obtaining context information from one or more information sources, implementing a rule engine for detecting abnormal situations based on rules stored in the rule database, etc.).

II. Electronic Device

Figure 2:
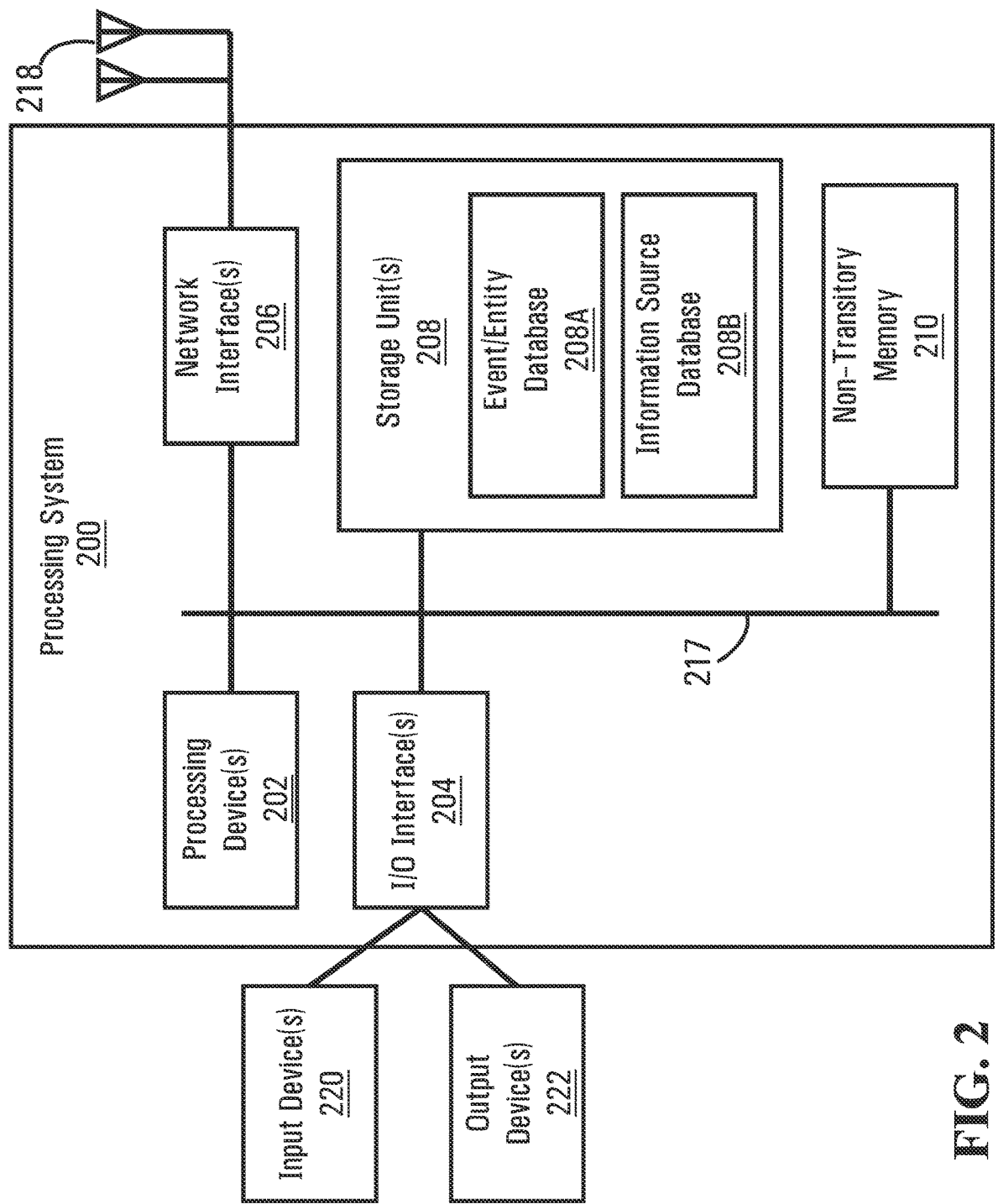
FIG. 2 is a block diagram illustrating an example processing system suitable for implementing an electronic device in the security system architecture of FIG. 1A or 1B.

Configurations of the electronic device 112 will be discussed in greater detail below with reference to the simplified block diagram of FIG. 2. The electronic device 112 comprises a processing system 200. The example processing system 200 described below, or variations thereof, may be used to implement certain functionality of the electronic devices 112, 112A and 112B. However, other processing system architectures may be suitable for implementing the electronic devices 112, 112A and 112B and may include components different from those discussed below. Although FIG. 2 shows a single instance of each component in the processing system 200, there may be multiple instances of each component.

The processing system 200 may include one or more processing devices 202, such as a central processing unit (CPU), a graphics processing unit (GPU), a tensor processing unit (TPU), a neural processing unit (NPU), an application-specific integrated circuit (ASIC), a field-programmable gate array (FPGA), a dedicated logic circuitry, or combinations thereof. The processing system 200 may include one or more input/output (I/O) controllers 204, to enable interfacing with one or more input devices 220 and/or output devices 222.

The processing system 200 may further include one or more network interfaces 206 for wired and/or wireless communication with the information sources 104 and/or the devices 120, 122, 124, 126, 128, via communication network 110 or peer-to-peer communication. The network interface(s) 206 may include wired links (e.g., Ethernet cable) and/or wireless links (e.g., one or more antennas) for intra-network and/or inter-network communications. The network interface(s) 206 may be connected to one or more antennas 218 of the electronic device 112, which are configured to facilitate wireless communication that may be implemented by the network interface(s) 206.

The processing system 200 may also include or have access to one or more storage units 208, which may include a mass storage unit such as a solid state drive, a hard disk drive, a magnetic disk drive and/or an optical disk drive. In some examples, the storage unit(s) 208 may implement an event/entity database 208A that stores information pertaining to events and entities that are presented to the user 160 of the electronic device 112, as discussed below. In some examples, the storage unit(s) 208 may implement an information source database 208B that stores an association between contextual information based on indicia and corresponding network addresses of information sources. The usefulness of the event/entity database 208A and the information source database 208B will become apparent later on from a reading of this document. As noted above, in some applications rule database 150 may be at least partially implemented at electronic device 112. For example, in such applications, rule database 150 may be at least partially implemented in storage units(s) 208. It is noted that in a client-server implementation, such as the example implementation shown in FIG. 1B, the event/entity database 208A, the information source database 208B and/or the rule database 150 may be implemented at the server (e.g., at electronic device 112B in FIG. 1B) or at storage units accessible by the server.

The processing system 200 may include one or more non-transitory memories 210, which may include a volatile or non-volatile memory (e.g., a flash memory, a random-access memory (RAM), and/or a read-only memory (ROM)). The non-transitory memory(ies) 210 may store instructions for execution by the processing device(s) 202, such as to carry out example methods described in the present disclosure. The memory(ies) 210 may store other software (e.g., instructions for execution by the processing device(s) 202), such as an operating system and other applications/functions. In some examples, one or more data sets and/or modules may be provided by an external memory (e.g., an external drive in wired or wireless communication with the processing system 200) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

There may be a bus 217 providing communication among components of the processing system 200, including the processing device(s) 202, I/O interface(s) 204, network interface(s) 206, storage unit(s) 208, and/or memory(ies) 210. The bus 217 may be any suitable bus architecture including, for example, a memory bus, a peripheral bus or a video bus.

In FIG. 2, input device(s) 220 and output device(s) 224 are shown as external to the processing system 200. The input device(s) 220 may include at least one of a keyboard, a mouse, and a microphone, which receive input from the user 160. Output device(s) 224 may include at least one of a display and a loudspeaker, which provide audio and visual output to the user 160. In other examples, one or more of the input device(s) 220 and/or the output device(s) 222 may be integrated together and/or with the processing system 200. For example, the input device 220 and the output device 222 may be integrated as a single component, such as a touch-sensitive display screen which, together with the I/O interface 204 (e.g., a touchscreen controller), provides a graphical user interface. In that case, the user 160 may interact with the GUI primarily through finger contacts and gestures on the touch-sensitive display.

III. Method for Defining Rules

One of the methods carried out by the processing device(s) 202 executing the computer-readable instructions in the memory(ies) 210 includes obtaining indicia (e.g., based on user input made in an area of a graphical user interface), retrieving contextual information from one or more of the information sources 104 based on the indicia, and exposing one or more condition-related user-selectable user interface elements corresponding to conditions based on the retrieved contextual information to enable the user 160 to configure a rule defining a subset of conditions for identifying an occurrence of a situation in the security system.

Figure 3:
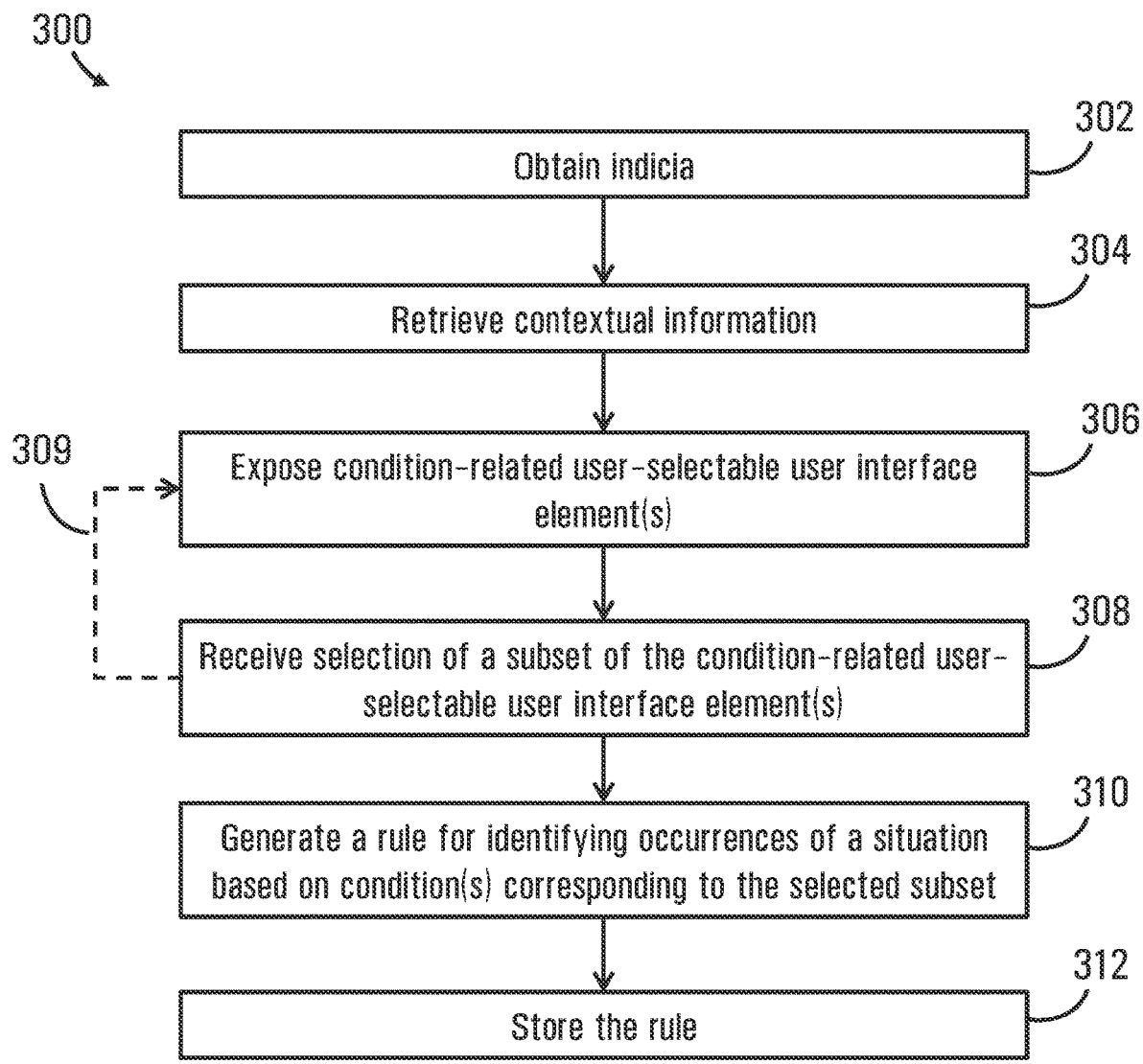
FIG. 3 is a flowchart illustrating a method for defining rules for identifying occurrences of situations in a security system in accordance with example embodiments.

With reference therefore to FIG. 3, an example method 300 may be implemented by the electronic device 112 configured with a touch-sensitive display, mouse/keyboard-driven GUI or other implementation of a graphical user interface as discussed above.

Step 302:

At step 302, indicia are obtained. For example, in some embodiments the indicia may be obtained by detecting user input in an area of a user interface and obtaining the indicia based on the user input. For example, the user input could be user input indicating an occurrence of a situation for which a user wishes to configure a rule for detecting occurrences of that situation. For example, the user interface may include an actionable user interface element, such as a button, that can be activated by the user to add a new rule for identifying a situation. In some applications, the user interface may include a map with various actionable information elements (e.g., icons), a sidebar with various actionable information elements and a search field allowing the entry of words by the user. Actionable information elements can represent "events" (which typically have a timestamp) or "entities" (which typically do not). Also, words entered in the search field can also represent "entities". In such applications, each such event or entity may be associated with indicia that is stored in the event/entity database 208A, for example. In such applications, the user input based on which the indicia are obtained could include the selection of a user interface element corresponding to an entity or event in the security system that is associated with time-related and/or location-related indicia (e.g., detecting that the user has selected (e.g., right-clicked on) a user interface element displaying a video feed from a geo-positioned security camera to identify an occurrence of a situation in the video feed at a particular time). In such applications, by virtue of implementing the user interface, the electronic device 112 is aware of what event or entity is represented by such user input and, therefore, the electronic device 112 could access the event/entity database 208A (if necessary) to obtain the relevant indicia. For example, in such implementations, the indicia can include the timestamp of the video and/or the location associated with the camera/video that the user selected. It is also noted that in some implementations, the time-related indicia used to retrieve contextual information may be the time/timestamp at which the user's selection/input is detected.

In other implementations, the indicia may be obtained without user input, as discussed below.

In the case where the user input consisted of selecting an actionable information element corresponding to an event (e.g., selection of an "access granted" icon somewhere on the map), the indicia may comprise a timestamp and location associated with that event and possibly identifier information regarding that event (e.g., door ID and badge ID).

In the case where the user input consisted of selecting an actionable information element corresponding to an entity (e.g., selection of a "door" icon somewhere on the map), the indicia may comprise an identifier of the selected entity (e.g., door ID), together with (optionally) a location (e.g., a floor, a room, or an area where the door is located).

In some implementations, obtaining the indicia at step 302 may involve prompting the user to provide and/or refine location-related indicia and/or time-related indicia. For example, as noted above, a user may initially select a user interface element corresponding to an entity or an event in the security system that may be associated with location-related indicia, time-related indicia or both. When one is missing, the user may be prompted to provide the missing indicia. The user may also or instead be prompted to refine or generalize the location-related indicia and/or the time-related indicia. For example, if the user input consisted of selecting an actionable information element corresponding to an entity (e.g., selection of a "security camera" icon somewhere on the map) associated with identifier-related indicia (e.g., camera ID) and location-related indicia (e.g., GPS coordinates, a floor, a room, or an area where the security camera is located) but not necessarily time-related indicia, the user may be prompted to provide, refine or generalize the time-related indicia. For example, the user may be prompted to define time-related indicia indicative of a particular timeframe such as:

Hours:
   1) At a specific time of the day (e.g., 1:12 PM)
   2) Afternoon
   3) Working hours Days:
   1) A specific day (e.g., May $25^{th}$)
   2) On Wednesdays
   3) On Workdays
   4) Everyday For example, in some implementations, obtaining the indicia at step 302 may involve identifying timestamp data associated with the user input, exposing, via the user interface, plural time-related user-selectable user interface elements based on the timestamp data associated with the user input, and after receiving, via the user interface, selection of one of the time-related user-selectable user interface elements, assigning a timeframe corresponding to the selected one of the time-related user-selectable user interface elements as the time-related indicia. In such implementations, each time-related user-selectable user interface element may correspond to a different timeframe based on the timestamp data associated with the user input, such as those discussed above.

This kind of provision, refinement or generalization may also be done for the location-related indicia. For example, the user may be prompted to define location-related indicia indicative of a particular location such as:

1) A particular city
   2) A particular building
   3) A particular room
   4) A particular shop
   5) A parking lot
   6) A parking structure
   7) A particular floor of the parking structure
   8) A particular parking spot
   9) A particular GPS location (latitude, longitude, altitude)

For example, in some implementations, obtaining the indicia at step 302 may involve identifying location data associated with the user input, exposing, via the user interface, plural location-related user-selectable user interface elements based on the location data, and after receiving, via the user interface, selection of one of the location-related user-selectable user interface elements, assigning a region corresponding to the selected one of the location-related user-selectable user interface elements as the location-related indicia. In such implementations, each location-related user-selectable user interface element may correspond to a different generalization of a region, such as those discussed above.

In some implementations, the user input indicating an occurrence of a situation may be user input indicating selection, via the user interface, of one or more events (e.g., an access granted event, a glass broken event, a license plate hit event, an unattended package event, an interlock access denied event) and/or selection, via the user interface, of one or more entities (e.g., a security camera, an access point, a person, a videoconference camera, a building zone, a parking lot, a microphone, a telephone, a user note). In some cases, the user input may include plural selections, such as selections of at least two entities, selections of one entity at different times, selections of at least two events, or selections of at least one event and at least one entity. In such cases, obtaining indicia based on the user input may involve obtaining a respective subset of indicia for each selection of an entity or an event.

Step 304

At step 304, the electronic device 112 proceeds to execute further steps in order to access one or more of the information sources 104 to retrieve contextual information based on the indicia obtained at step 302. It is recalled that some of the information sources (e.g., information sources 104(1), 104(2) and 104(3) in FIGS. 1A and 1B) may be accessed over the network 110 whereas others of the information sources (e.g., information source 104(n) in FIGS. 1A and 1B) may be accessed by the electronic device 112 over a direct local link. It is further noted that in some implementations one or more of the information sources 104 could be local to the electronic device 112 of FIG. 1A or the electronic device 112B of FIG. 1B. In addition, in the case of the implementation shown in FIG. 1B, accessing the one or more information sources 104 could include the electronic device 112A sending a request to the electronic device 112B, in response to which the electronic device 112B may then access one or more of the information sources 104.

As noted above, in some implementations obtaining the indicia at step 302 involves obtaining a respective subset of indicia for each selection of multiple selections of entities and/or events. In such implementations, accessing one or more information sources to retrieve contextual information at step 304 may correspondingly involve, for each respective subset of indicia, accessing one or more of the information sources 104 to retrieve a respective subset of contextual information based on the respective subset of indicia.

In some implementations, the contextual information comprises meta-data. For example, the contextual information may be meta-data that is associated with data collected in the security system, such as timestamp meta-data associated with video data collected from the security camera 126 or employee name meta-data associated with badge ID data collected from the card reader or keypad 120 as part of an access event. In other cases, the contextual information could be extracted meta-data that is generated from data collected in the security system by processing the collected data associated with at least one entity or event to extract additional information. For example, for video data from a video feed showing a specific view, the extracted meta-data could be people counting meta-data or crowd estimation meta-data, car meta-data (color, make, model) and/or direction of traffic meta-data, wherein the extracted meta-data is extracted from the video data by video content analysis. Any suitable video content analysis may be performed on the video data to detect and/or determine temporal and/or spatial events. The temporal and/or spatial events can be stored to the meta-data associated with the video data to indicate the type of event, any characteristics and/or attributes of the event, and timestamp(s) of the event. In a use case such as a retail shop, the contextual information retrieved at step 304 could include a mix of extracted and non-extracted meta-data such as an income amount from the cashier integration, conversion rate and/or a record of people in and out of the shop.

In some implementations, accessing one or more of the information sources 104 to retrieve contextual information at step 304 involves accessing two or more of the information sources 104. For example, in some implementations the electronic device 112 may access at least one information source internal to the security system to retrieve contextual information based on internal data collected in operation of the security system, and the electronic device 112 may also access at least one information source external to the security system to retrieve contextual information based on external data that is independent of operation of the security system. Non-limiting examples of such external information sources could include an information sources providing weather condition information, an information source providing social media information, an information source providing news and current events information, and/or an information source providing traffic information.

Step 306:

At step 306, the electronic device 112 exposes, via the user interface, one or more condition-related user-selectable user interface elements corresponding to one or more respective conditions based on the contextual information retrieved at step 304. Non-limiting examples of conditions could include a particular time or timeframe (e.g., weekend, after hours, workday, holiday, etc.), a particular location or region (e.g., an address, a floor of a building, a particular room on a particular floor, a parking lot, a parking space, etc.), a particular action or status (e.g., direction of traffic, unattended package, broken window, gunshot detection, etc.), a weather-related condition (e.g., rain, snow, etc.), a news-related condition (e.g., active shooter, mass protest, etc.).

In some implementations, in addition to exposing the one or more conditions based on the contextual information, the electronic device 112 may also expose, via the user interface, logic-related user-selectable user interface elements for use in defining logical relations between conditions corresponding to the one or more condition-related user-selectable user interface elements. For example, each logic-related user-selectable user interface element may correspond to a respective logical operation, and the logic-related user-selectable user interface elements may be selectable by the user, via the user interface, to define logical relations between selected condition-related user-selectable user interface elements to define the rule for identifying occurrences of the situation.

In some implementations, exposing one or more condition-related user-selectable user interface elements at step 306 involves exposing, via the user interface, one or more condition category-related user-selectable user interface elements, each condition category-related user-selectable user interface element corresponding to a respective category of conditions. In such implementations, after receiving, via the user interface, selection of one of the one or more condition category-related user-selectable user interface elements, the electronic device 112 may expose, via the user interface, one or more condition-related user-selectable user interface elements corresponding to respective conditions within the respective category of conditions corresponding to the selected one of the one or more condition category-related user-selectable user interface elements. In other words, the condition category-related user-selectable user interface elements may be a subset of the condition-related user-selectable user interface elements.

As noted above, in some implementations obtaining the indicia at step 302 involves obtaining a respective subset of indicia for each selection of multiple selections of entities and/or events, and accessing one or more information sources to retrieve contextual information at step 304 may involve, for each respective subset of indicia, accessing one or more of the information sources 104 to retrieve a respective subset of contextual information based on the respective subset of indicia. In such implementations, exposing one or more condition-related user-selectable user interface elements at step 306 may involve processing the respective subsets of contextual information to extract similarities in the respective subsets of contextual information, and exposing, via the user interface, at least one condition-related user-selectable user interface element corresponding to a condition based on one or more extracted similarities in the respective subsets of contextual information for two or more of the plural selections. For example, in such implementations, the electronic device 112 may collect the multiple subsets of contextual information (e.g., external and/or internal contextual information), look for similarities in the respective subsets and proposes a condition to meet this scenario to the user 160. By having the user 160 select several situations, events or entities (each associated with a respective subset of indicia), the electronic device 112 can potentially retrieve all the associated meta-data and expose condition-related user-selectable user interface element corresponding to the similarities in the respective subsets of meta-data, which potentially acts to filter out at least some of the noise (i.e., the non-relevant conditions) of a specific situation and let the user 160 make the final selection of the needed conditions to define a rule for identifying the specific situation.

Step 308:

At step 308, the electronic device 112 receives, via the user interface, selection of a subset of the one or more condition-related user-selectable user interface elements. For example, in some embodiments, the one or more condition-related user-selectable user interface elements exposed at step 306 includes a plurality of condition-related user-selectable user interface elements and the selected subset of one or more condition-related user-selectable user interface elements received at step 308 is a subset of the plurality of condition-related user-selectable user interface elements selected by the user.

As noted above, in some implementations in addition to exposing the one or more conditions based on the contextual information, the electronic device 112 may also expose, via the user interface, logic-related user-selectable user interface elements for use in defining logical relations between conditions. In such implementations, at step 308, the electronic device 112 may receive, via the user interface, selection of at least two of the one or more condition-related user-selectable user interface elements and selection of at least one of the logic-related user-selectable user interface elements to define the rule for identifying occurrences of the situation.

In some implementations, the one or more condition-related user-selectable user interface elements exposed at step 306 may be refined, updated or otherwise changed based on the selection(s) received at step 308, as indicated by the optional path 309 in FIG. 3. In this way, the user's selection(s) of the exposed condition-related user-selectable user interface elements at 308 can serve as feedback to the electronic device 112 to refine the set of one or more condition-related user-selectable user interface elements that are exposed to the user at step 306. For example, in some implementations, this feedback may cause the electronic device 112 to stop exposing one or more of the condition-related user-selectable user interface elements and/or to start exposing one or more condition-related user-selectable user interface elements that was not previously exposed at step 306. For example, the electronic device 112 may combine elements of the indicia obtained at step 302 with elements of a condition corresponding to one of the condition-related user-selectable user interface elements selected at step 308 to retrieve further contextual information, which could result in the exposure of one or more new or different condition-related user-selectable user interface elements at step 306. It should be understood that this process of repeating steps 306 and 308 may be performed any suitable number of times/iterations.

As noted above, in some implementations, the indicia obtained at step 302 may be obtained without user input. For example, in some implementations, rather than retrieving contextual information based on indicia obtained based on detected user input, the electronic device 112 may be operated in a "rule setting" mode in which contextual information related to currently viewed data (e.g., currently viewed live or recorded feed(s) of video data) may be automatically retrieved based on indicia associated with the currently viewed data (e.g., location-related indicia and/or time-related indicia for the camera(s) that generated the currently viewed live or recorded video feed(s)) without requiring specific input from the user. In such implementations, condition-related user-selectable user interface elements corresponding to conditions based on the automatically retrieved contextual information may be automatically exposed to the user via the user interface (e.g., while the currently viewed data continues to be exposed/displayed). In this scenario, the rule defining process for a particular situation in the "rule setting" mode may be initiated when the user selects at least one of the automatically exposed condition-related user-selectable user interface elements.

Step 310:

At step 310, the electronic device 112 generates a rule for identifying occurrences of a situation based on the one or more respective conditions corresponding to the subset of the one or more condition-related user-selectable user interface elements selected at step 308.

As noted above, in some implementations, receiving selection of the subset of the one or more condition-related user-selectable user interface elements comprises receiving, via the user interface, selection of at least two of the one or more condition-related user-selectable user interface elements and selection of at least one of the logic-related user-selectable user interface elements to define the rule for identifying occurrences of the situation. In such implementations, generating the rule at step 310 involves generating the rule based on the respective conditions corresponding to the at least two selected condition-related user-selectable user interface elements and the respective logic operations corresponding to the at least one selected logic-related user-selectable user interface element. In some implementations, the user can optionally select the form of the notification (e.g., alert on the GUI, email, sms, generate report, etc.) and to whom (e.g., the operator, someone in the field at their mobile device, such as security guard, etc.) the notifications are delivered when the rule is triggered.

Step 312:

At step 312, the electronic device 112 stores the rule in the rule database 150 for use in monitoring for occurrences of the situation.

In some implementations, the method 300 further comprises a step of receiving, via the user interface, an indication of one or more tags to be triggered when an occurrence of the situation is identified, each tag being associated with a respective subset of one or more actions to perform if the tag is triggered. In such implementations, storing the rule in the rule database 150 at step 312 may involve storing the one or more tags in association with the rule such that identifying an occurrence of the situation based on the rule triggers the one or more tags associated with the rule.

In some implementations, for at least one of the one or more tags, the respective subset of one or more actions to perform if the tag is triggered includes one or more of raising an alarm and sending a notification.

In some implementations, the method 300 further comprises a step of receiving, via the user interface, an indication of one or more tags to be triggered when a specific condition included in the definition of the rule for identifying an occurrence of the situation is present when an occurrence of the situation is identified, each tag to be triggered when the specific condition is present being associated with a respective subset of one or more actions to perform if the tag is triggered. In such implementations, storing the rule in the rule database at step 312 may involve storing the one or more tags in association with the specific condition included in the definition of the rule such that identifying an occurrence of the situation in which the specific condition is present based on the rule triggers the one or more tags associated with the specific condition.

IV. Method for Rule-Based Detection of Situations

Another of the methods that may be carried out by the processing device(s) 202 executing the computer-readable instructions in the memory(ies) 210 includes collecting and analyzing data in the security system with reference to rules stored in the rule database 150 to identify occurrences of situations in accordance with the stored rules and trigger corresponding workflows where applicable.

Figure 4:
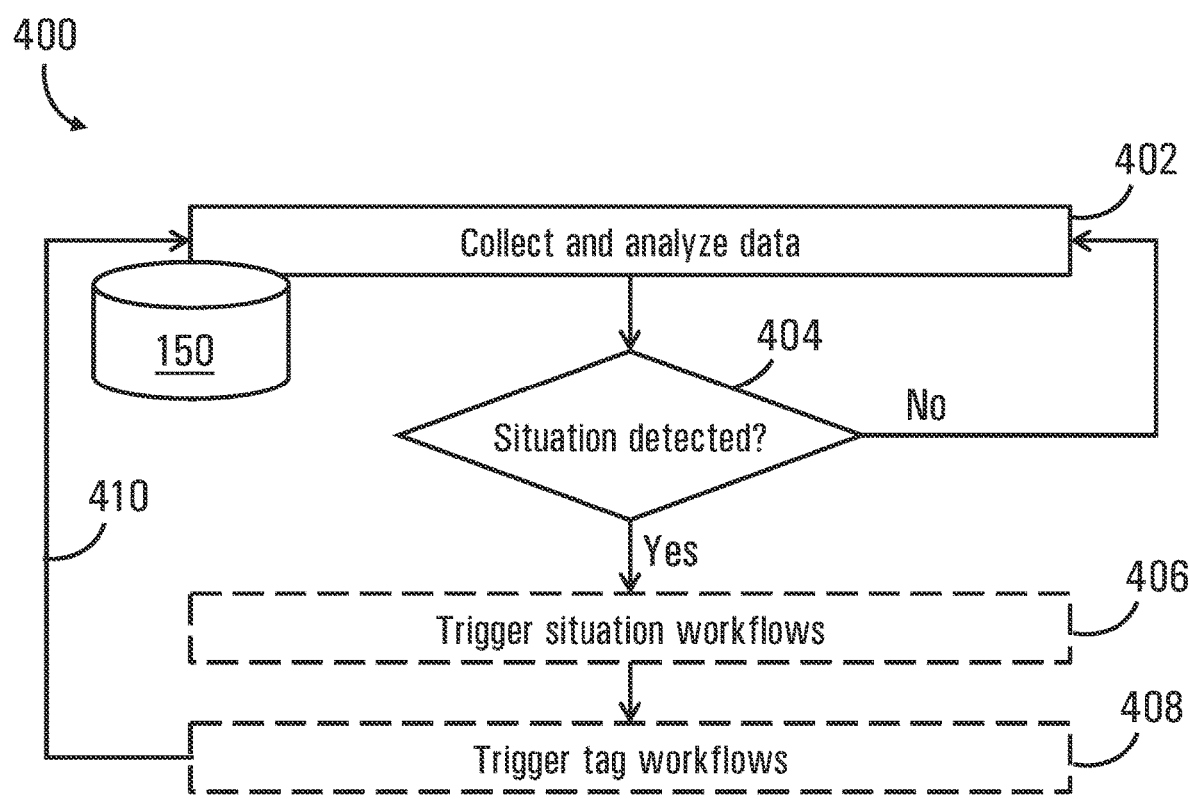
FIG. 4 is a flowchart illustrating a method for applying rules for identifying occurrences of situations and triggering associated workflows in a security system in accordance with example embodiments.

With reference therefore to FIG. 4, an example method 400 may be implemented by the electronic device 112 or another electronic device in the security system architecture 100 that has access to rule database 150. It should be understood that in some implementations the method 400 may be performed after the method 300 has been performed, and in other implementations the methods 300 and 400 may be performed simultaneously.

Step 402:

At step 402, data from the security system is collected and analyzed with reference to rules stored in the rule database 150. In some implementations this step may be implemented with a rule engine. For example, in some implementations, for a given rule stored in the rule database 150, collecting and analyzing data at step 402 involves, applying, using a rule engine, the rule stored in the rule database to video data from at least one camera, such as the security camera 126, to determine whether the rule for identifying an occurrence of a situation has been met. For example, in some implementations, applying the rule to the live video data comprises extracting meta-data from the live video data and applying the rule to the extracted meta-data, using the rule engine, to determine whether the rule for identifying an occurrence of the situation has been met. In such implementations, the meta-data extracted from the live video corresponds to at least one of the one or more respective conditions on which the rule for identifying occurrences of the situation is based. Although the foregoing example relates to video monitoring, it should be understood that embodiments of the present disclosure are not limited to video analysis. For example, the security system may receive events, from a data source, that are indicative of surveillance issues in a given region, such as a broken window detection, gunshot detection or some other data indicative of an anomalous situation.

Step 404:

At step 404, a determination is made as to whether a situation has been detected, which occurs when the condition(s) in a rule are met. If no situation has been detected, the method 400 returns to step 402 (the "No" path in FIG. 4). On the other hand, if a situation is detected, the method 400 proceeds to step 406 (the "Yes" path in FIG. 4).

Step 406:

At step 406, if a specific situation workflow has been defined for the detected situation, then that specific situation workflow may be triggered. The specific situation workflow for a situation may define one or more actions that are to be triggered when an occurrence of the situation is detected. For example, this could include actions such as raise an alarm (transmit a visual or audio indication to a user), record video, flag video, or control access control devices (lock or unlock doors, etc).

Step 408:

At step 408, if one or more tag workflows have been defined for the detected situation, then the one or more tag workflows defined for the detected situation may be triggered. It is noted that not all tag workflows defined for the detected situation may be triggered by detection of an occurrence of the situation. For example, a tag having a corresponding workflow may only be triggered if a certain condition defined in the corresponding rule for detecting the situation is met, but that condition may not necessarily be required in order for an occurrence of the situation to be detected based on the rule. For example, a rule for identifying an occurrence of a particular situation may include two conditions linked by a Boolean "OR" operator and the two conditions may be associated with different tags have different tag workflows. In this example scenario, an occurrence of the situation may be detected based on the rule even if only one of the two conditions is met, thereby triggering the tag workflow associated with the met condition, while the tag workflow associated with the unmet condition goes untriggered.

After step 408, method 400 returns to step 402, as indicated at 410 in FIG. 4

In some implementations, based on rule stored in the rule database 150 for identifying occurrences of a first situation, the method 400 further comprises identifying an occurrence of a similar second situation having some but less than all conditions in common with the rule defined for identifying occurrences of the first situation. In such implementations, in response to identifying the occurrence of the similar second situation, the occurrence of the similar second situation may be exposed to a user, e.g., to the user 160 via the user interface of the electronic device 112.

For example, in some implementations, applying the rule to the live video data comprises extracting meta-data from the live video data and applying the rule to the extracted meta-data, using the rule engine, to determine whether the rule for identifying an occurrence of the situation has been met. In such implementations, the meta-data extracted from the live video corresponds to at least one of the one or more respective conditions on which the rule for identifying occurrences of the situation is based.

Figure 6A:
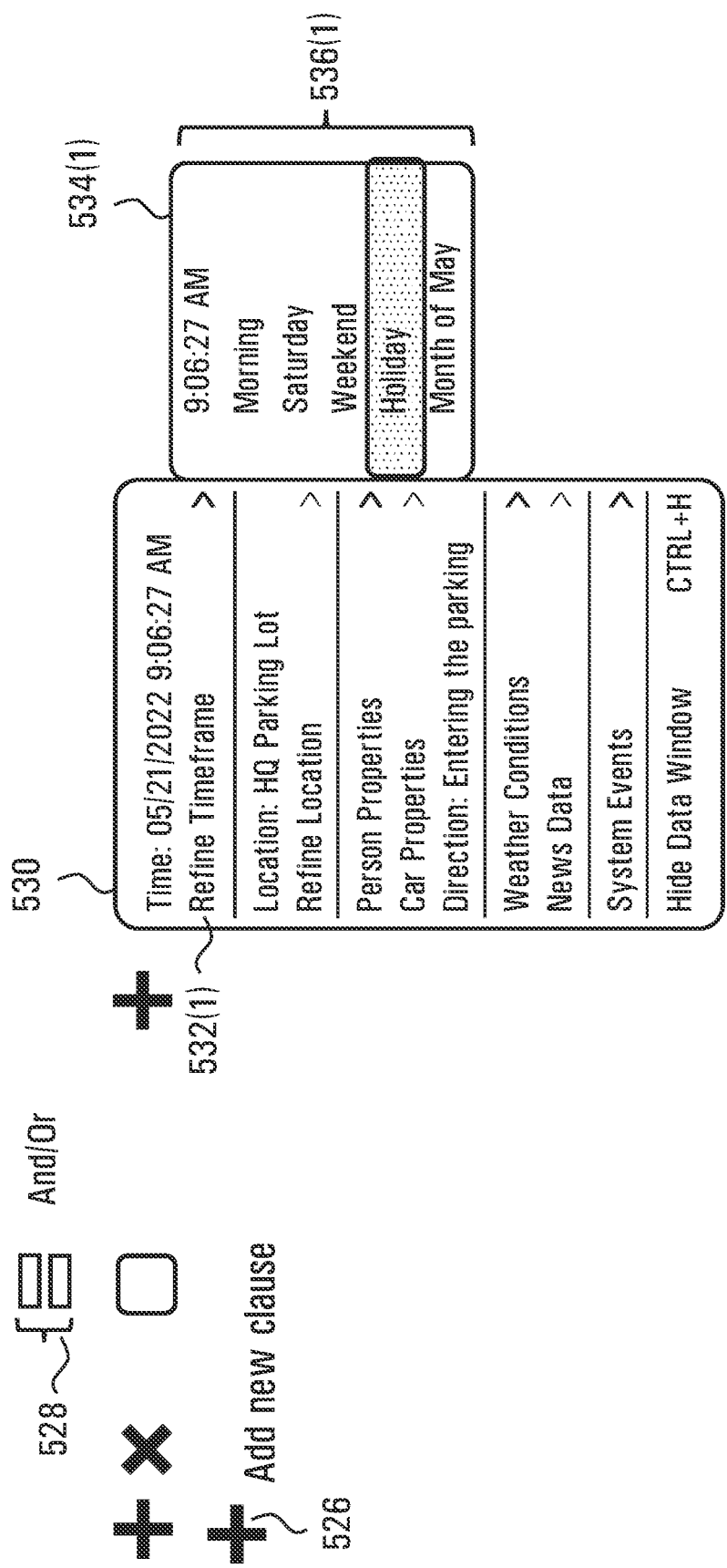
FIGS. 6A, 6B, 6C, 6D, 6E, 6F, 6G, 6H and 6I illustrate examples of user interface elements that may be displayed as part of the exemplary user interface of FIG. 5A and their use to define a rule for identifying an occurrence of a situation, in accordance with one embodiment.
Figure 6B:
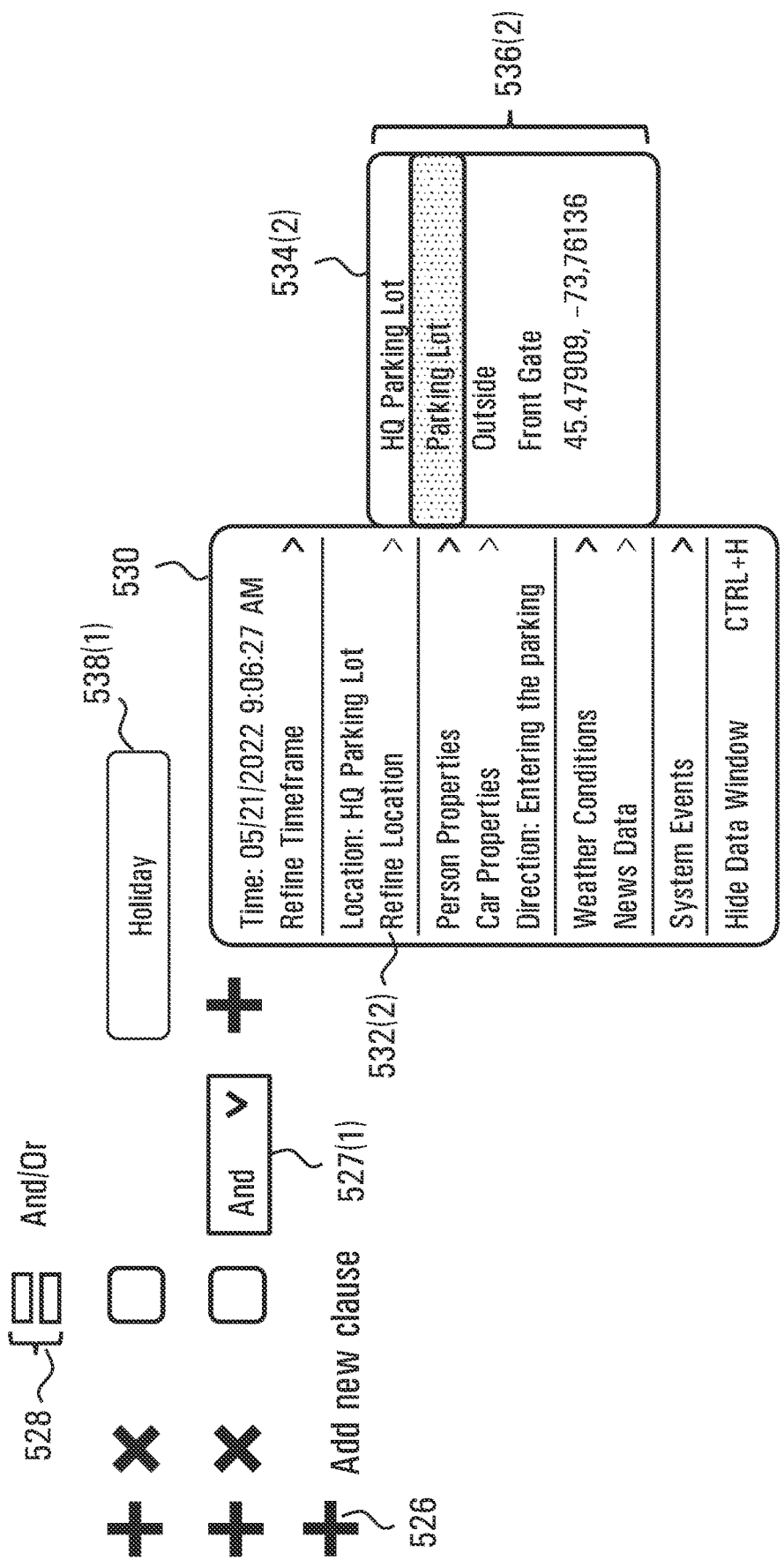
Figure 6C:
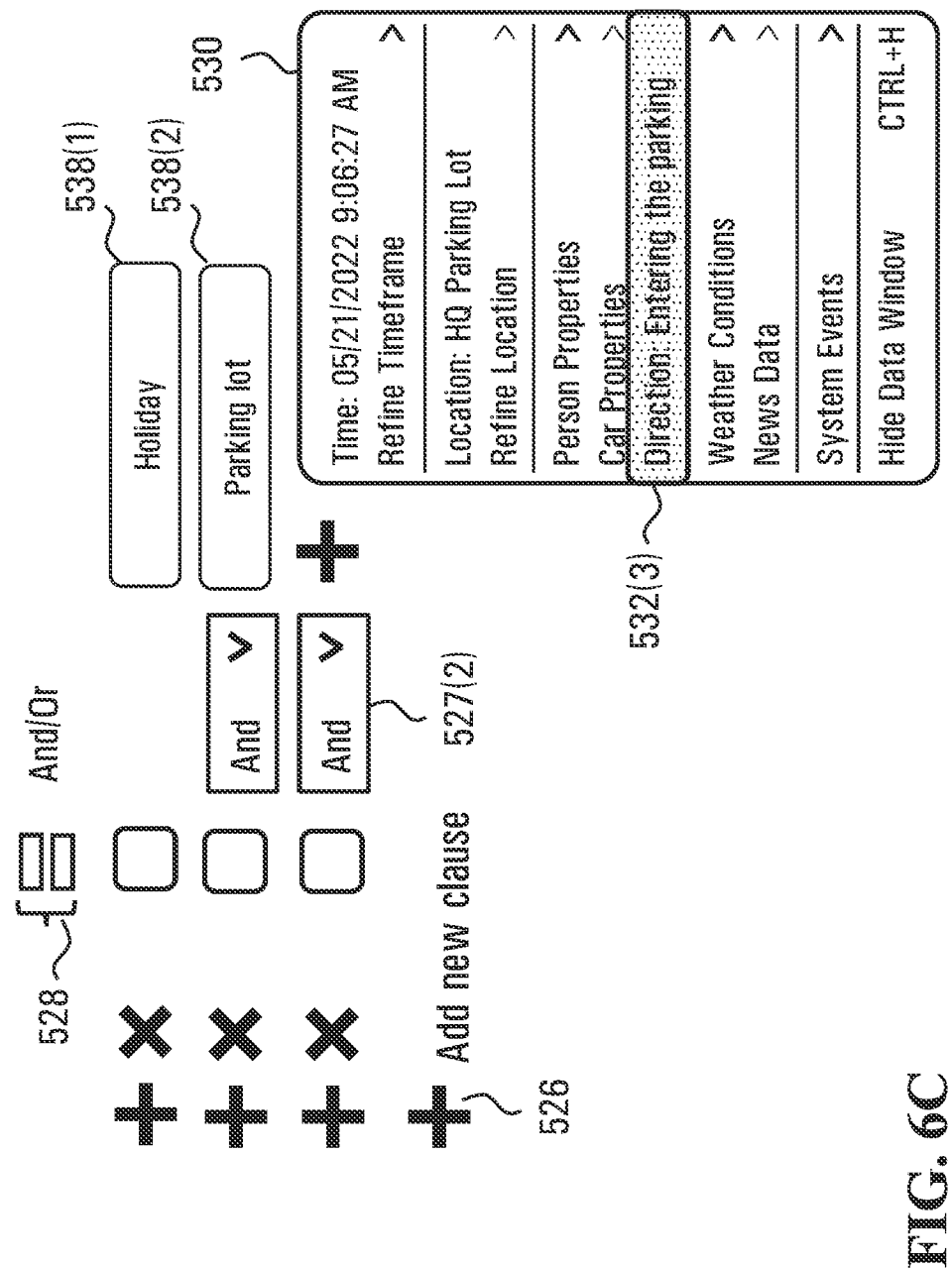
Figure 6D:
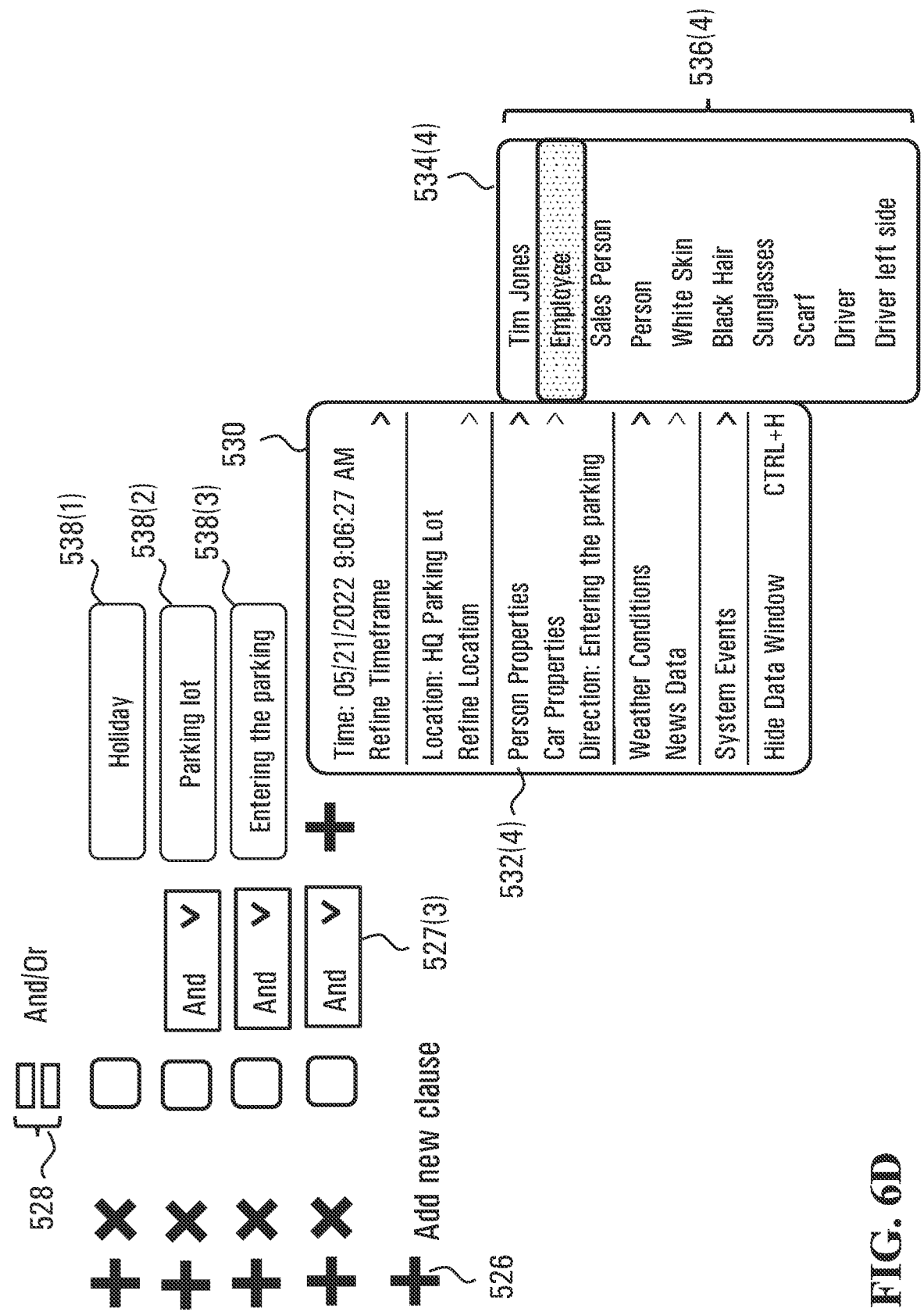
Figure 6E:
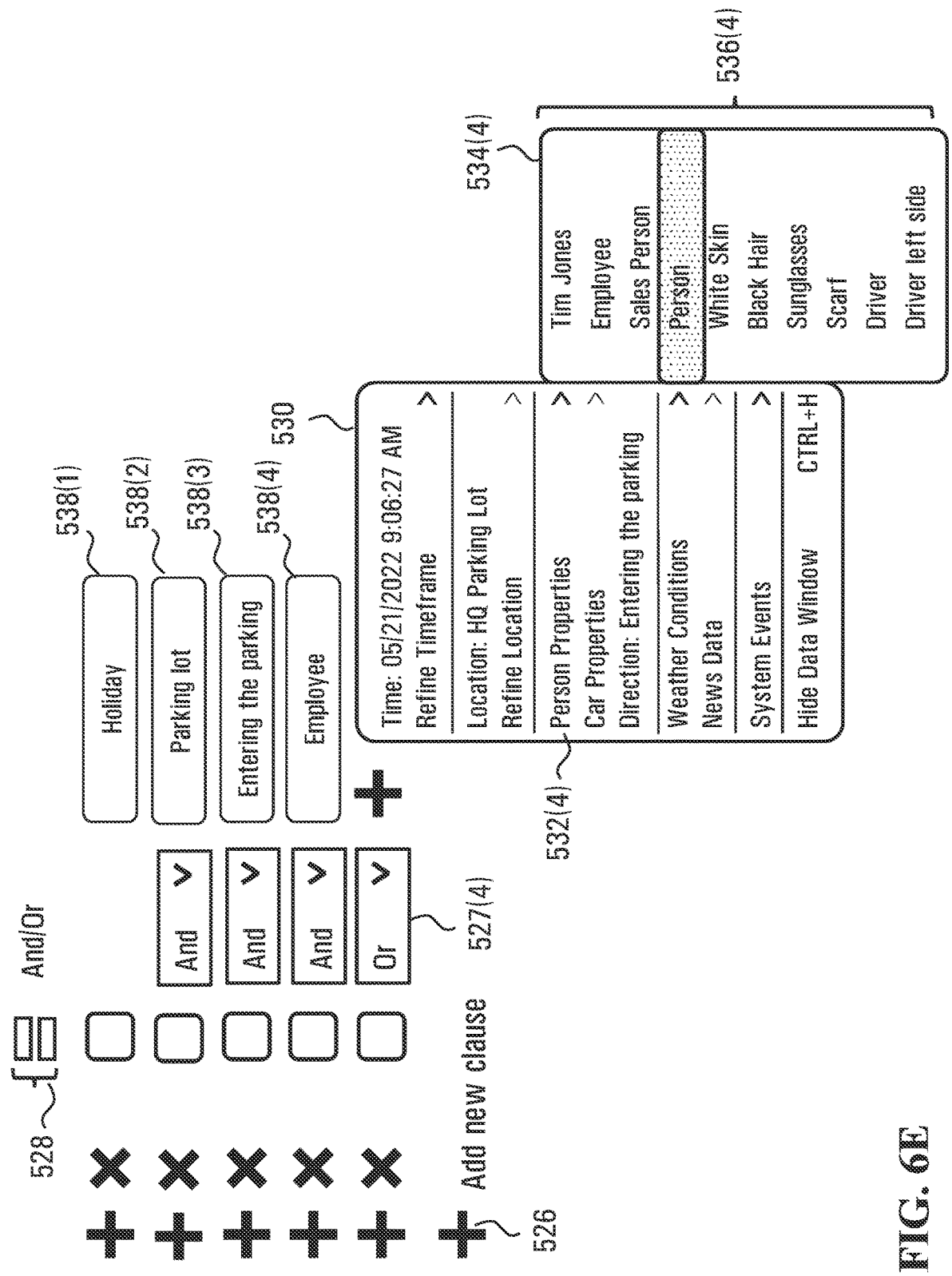
Figure 6F:
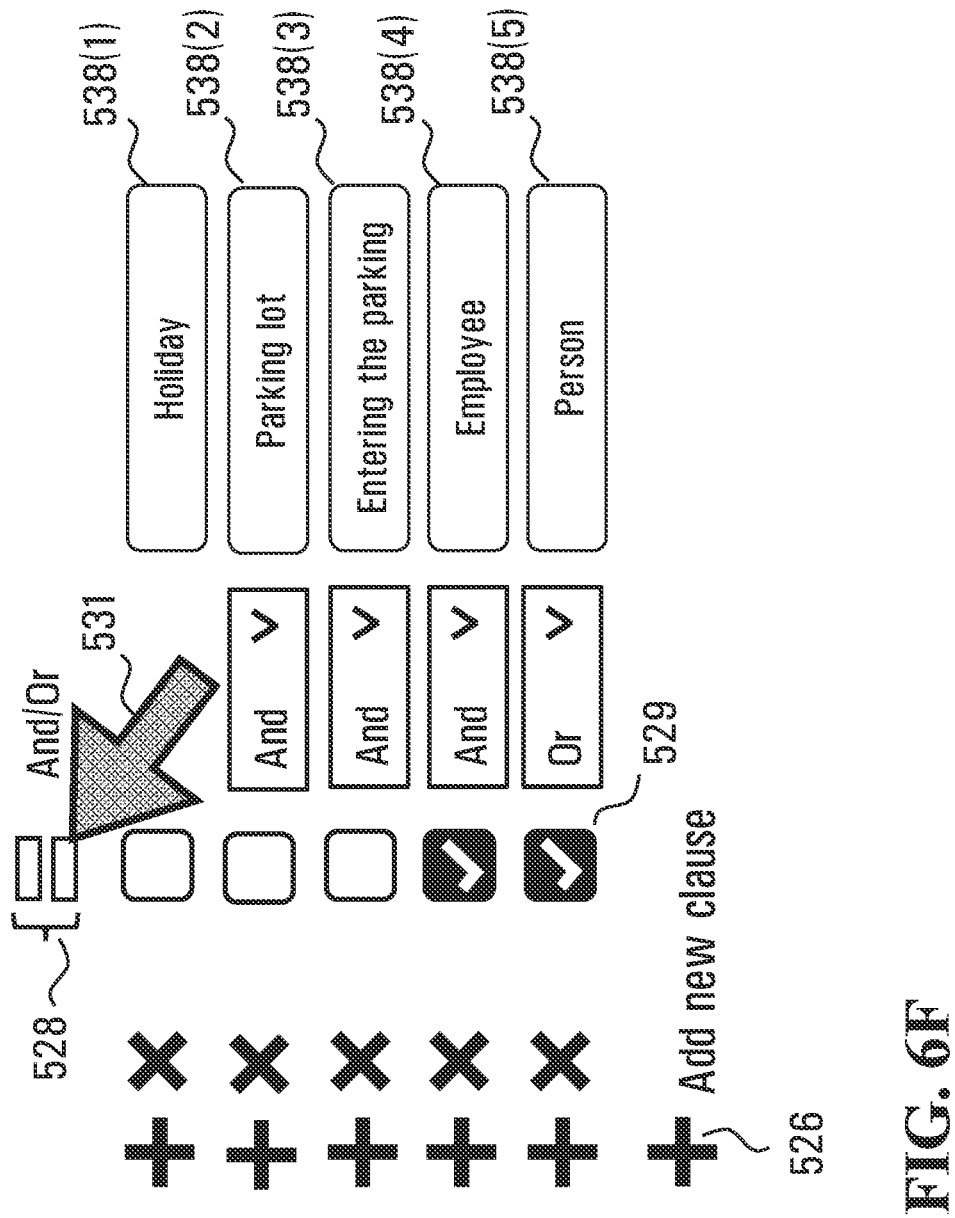
Figure 6G:
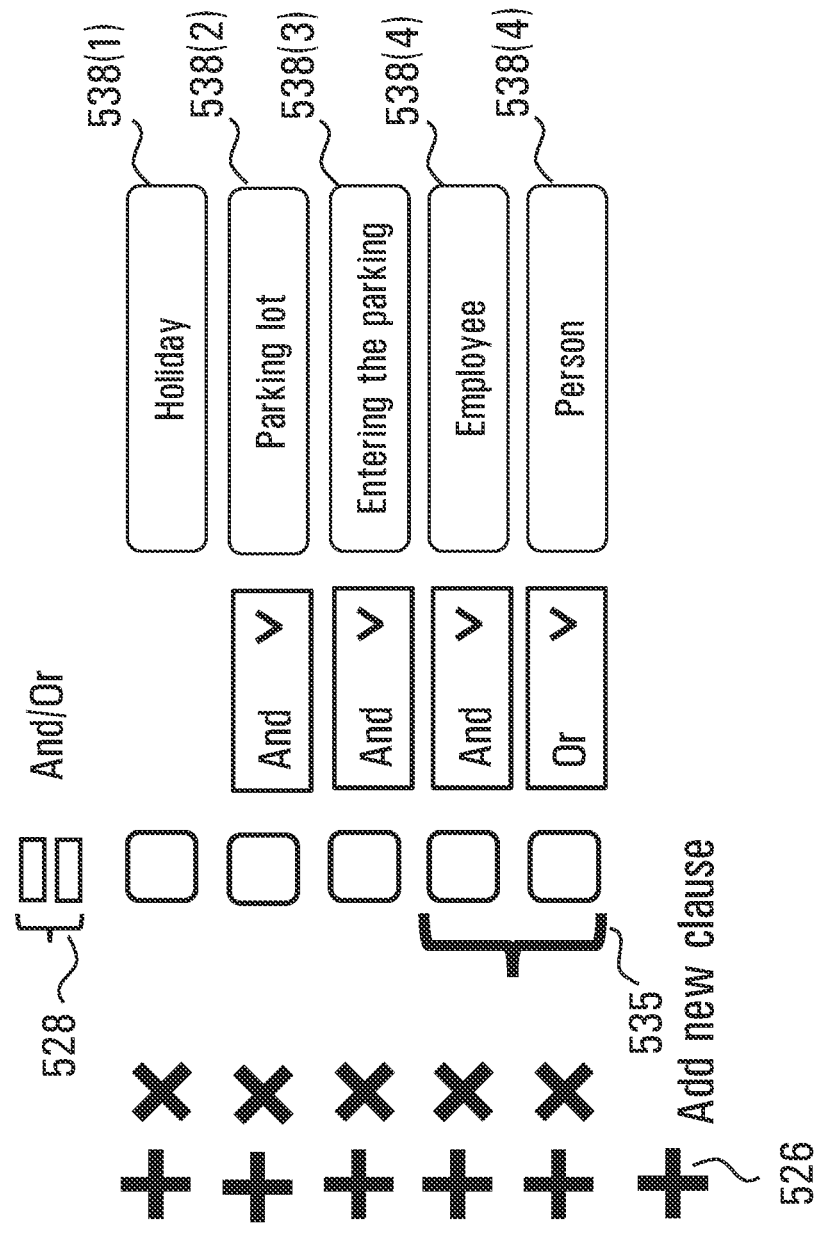
Figure 6H:
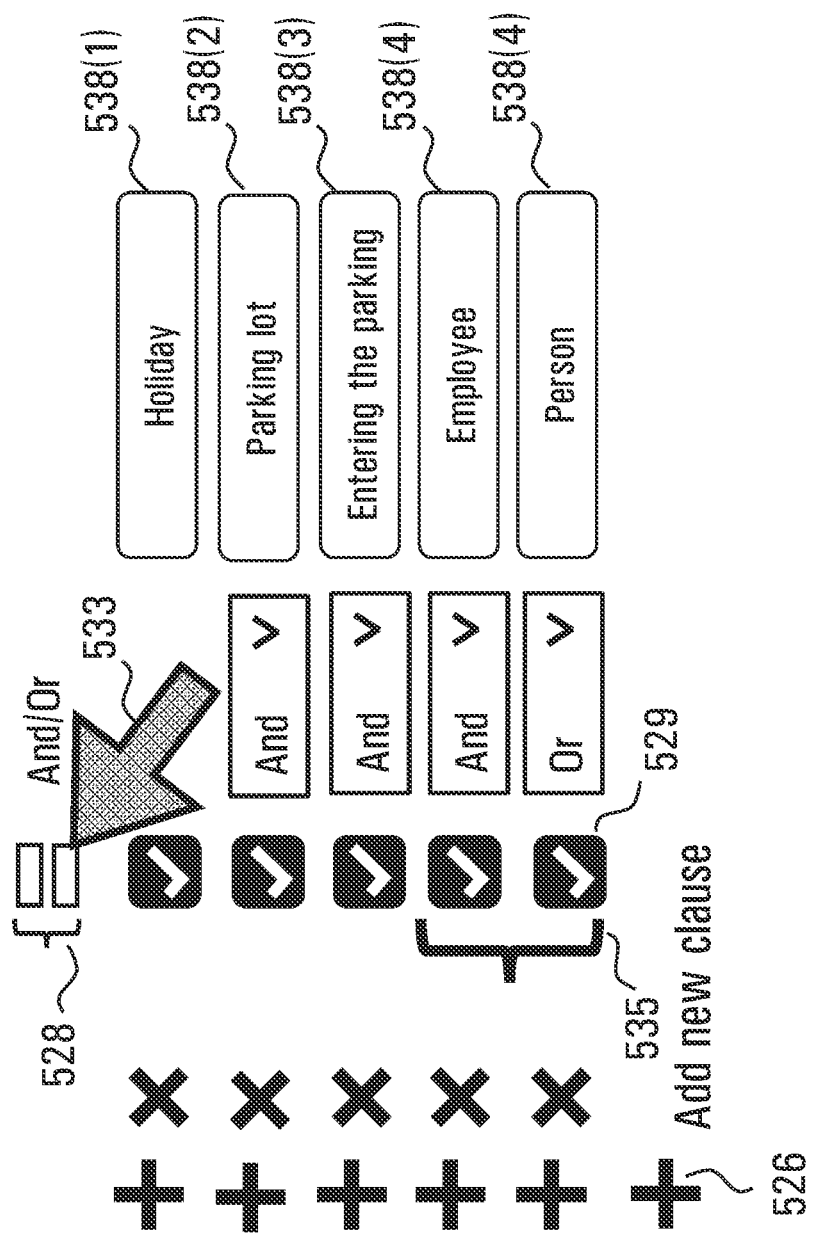
Figure 6I:
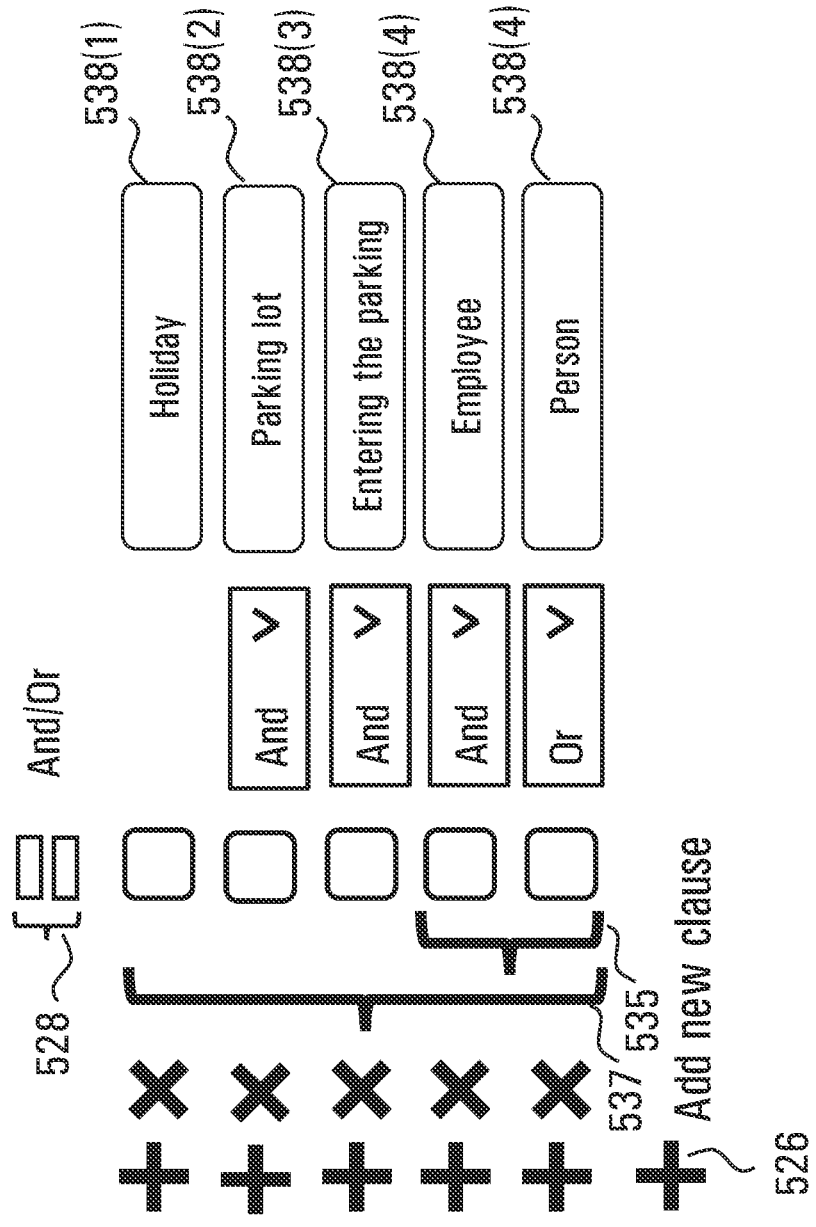
Figure 7:
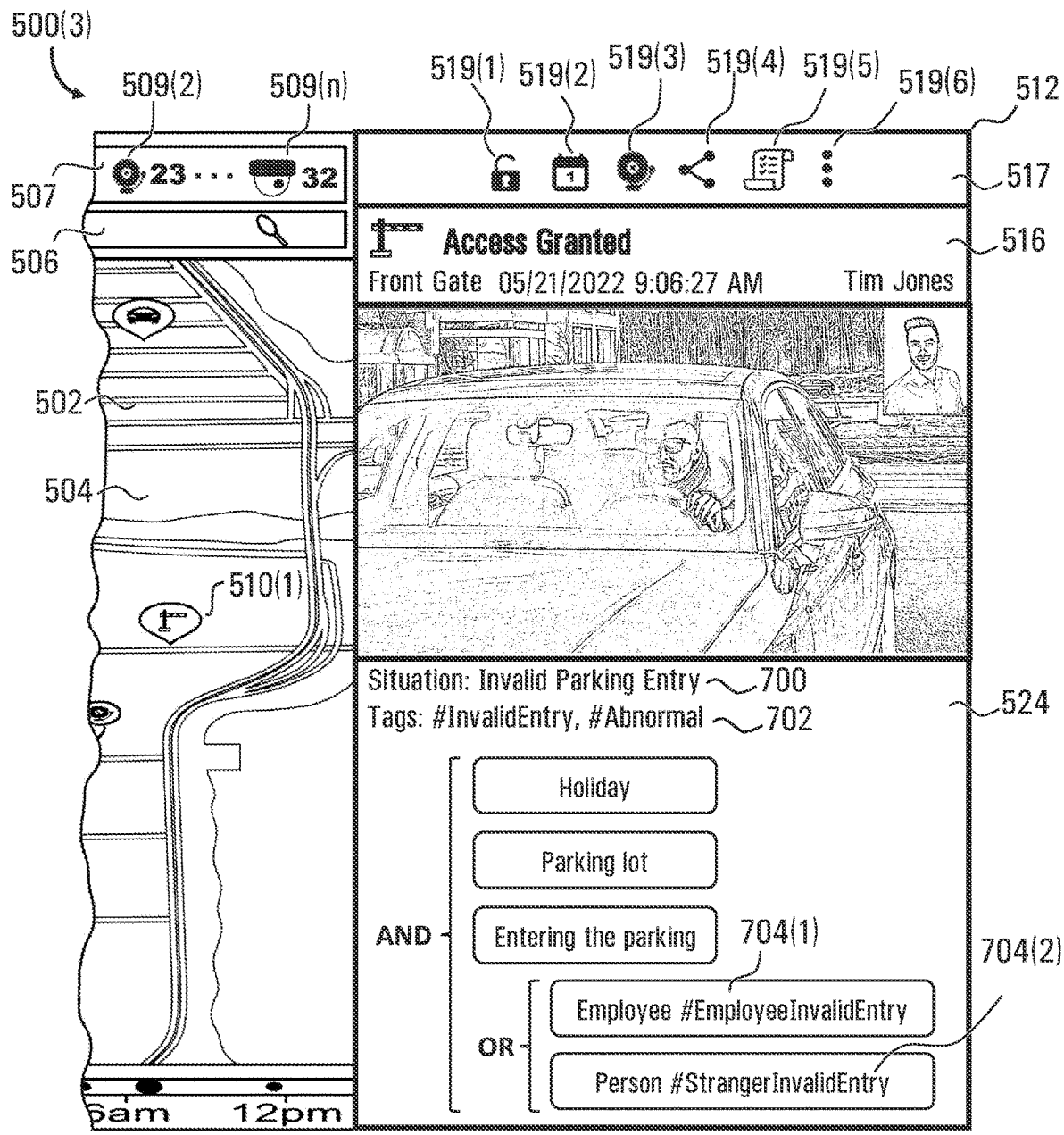
FIG. 7 illustrates the exemplary user interface of FIG. 5B updated to include a rule for identifying an abnormal situation based on the event that was selected in the exemplary user interface of FIG. 5A.

Example with Reference to FIGS. 5-7

By way of non-limiting example, operation of the method 300 of FIG. 3 is now described with additional reference to FIGS. 5A, 5B, FIGS. 6A-6I and FIG. 7.

Figure 5A:
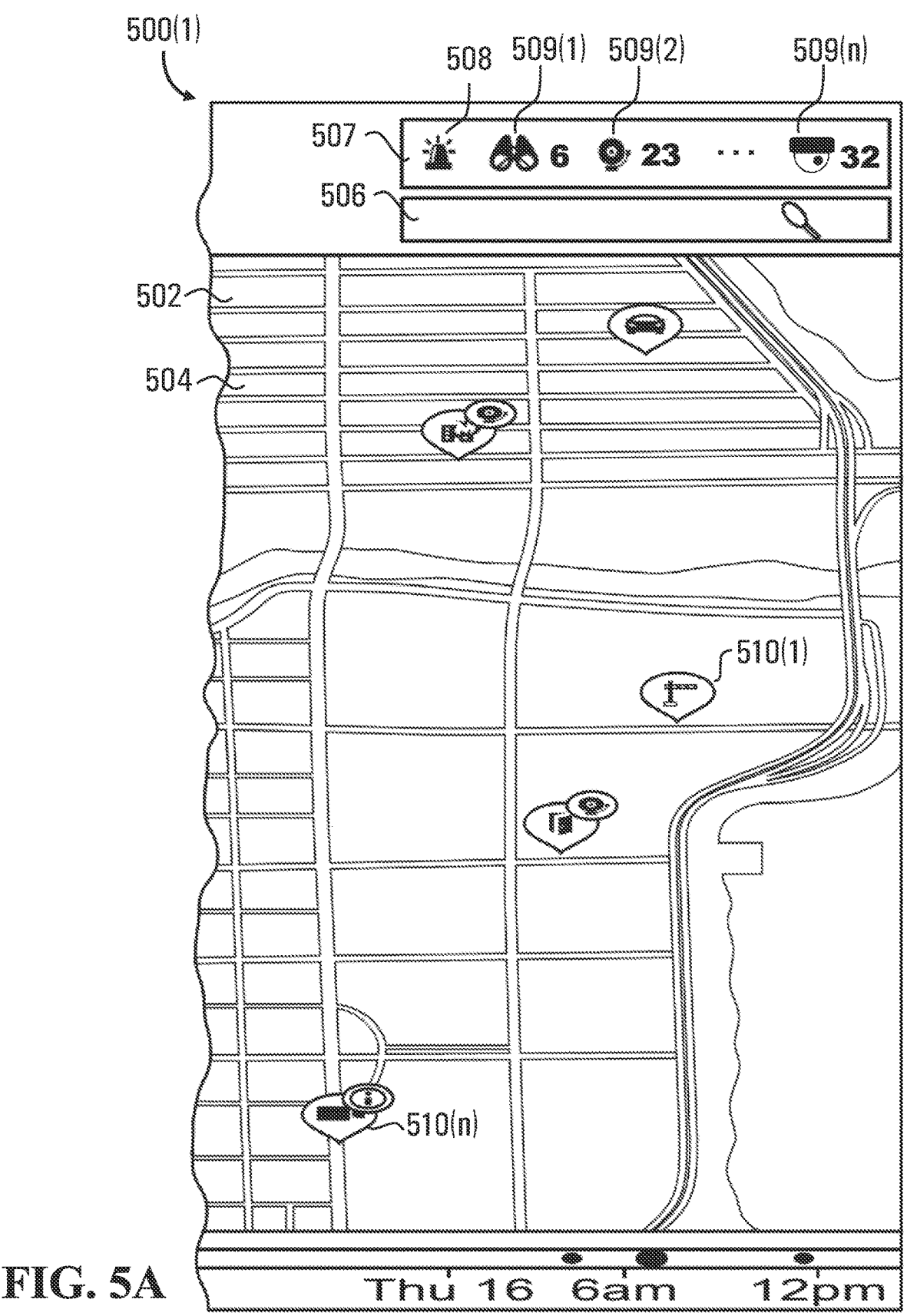
FIG. 5A illustrates an exemplary user interface of an electronic device of FIG. 1A or FIG. 1B, according to an embodiment of the present disclosure.

Beginning with FIG. 5A, GUI 500(1) includes a first portion 502 with a map 504, a search field 506, and a sidebar 507. The map 504 comprises one or more icons 510(1)-510(n) each of which represents an event. An event represented by one of the icons 510(1)-510(n) can be associated with indicia such as (i) a timestamp indicative of when the event occurred and (ii) a location indicative of where the event occurred. The location can be in the format of a GPS location or a floor/room of a building, for example.

In addition, an event represented by one of the icons 510(1)-510(n) may further be associated with additional indicia representative of an identifier that depends on the event "subtype". Non-limiting examples of event subtypes include "access granted", "glass break", "license plate hit", "unattended package" and "interlock access denied". Some of these subtypes may have specific identifiers as indicia.

For example, in the case of an "access granted" event subtype, the indicia may include a badge identifier (ID) and a door or gate ID, wherein the door or gate ID represents an identifier of a specific door or gate or an identifier of the card/badge/access control reader where access was granted and the badge ID represents an identifier of a specific badge to which access through the specific door or gate was granted. In the case of a "glass break" event subtype, the indicia may include a window ID, wherein the window ID represents an identifier of a specific window that was broken. In the case of a "license plate hit" event subtype, the indicia may include a license plate number or ID, wherein the license plate ID represents an identifier of a specific license plate that was detected to be on a hotlist or other list of license plate numbers. In the case of an "interlock access denied" event subtype, the indicia may include an interlock access ID, wherein the interlock access ID represents an identifier of a specific interlock access point where access was denied. In the case of an "unattended package" event subtype, the indicia may include a package ID, wherein the package ID represents an identifier of the unattended package.

Occurrence of events may be recorded by one or more systems (e.g., collections of sensors and processors) and the related indicia is stored in the indicia event/entity database 208A. Specifically, as events are detected throughout the region of interest (which may go beyond the limits of the map 504), the indicia (timestamp, location and possibly identifier(s)) are collected and stored in the event/entity database 208A. The event/entity database 208A thus stores the indicia for all detected events including the events for which corresponding icons 510(1)-510(n) are displayed on the map 504 and also other events that are not shown on the map 504. In some implementations, the occurrence of events may be processed in real-time as they are received by the system (e.g., electronic device 112B) to determine their associated indicia, and therefore in such embodiments the indicia may be obtained as the events are received without reference to the event/entity database 208A.

An algorithm could be implemented for determining which events to show on the map 504 and which events not to show on the map 504; such algorithm could be based on event aging, for example, so that only events occurring in the past X minutes are shown.

As mentioned above, the first portion 502 of the GUI 500(1) also includes a sidebar 507. The sidebar 507 may include an alarm icon 508. The alarm icon 508 indicates the occurrence of at least one alarm without a specific associated icon on the map 504. However, each alarm has a timestamp (e.g., when it started and/or the duration) and a location where the alarm occurred, and therefore each alarm qualifies as an event. The timestamp and the location associated with each alarm may be stored in the event/entity database 208A.

Also as mentioned above, the first portion 502 of the GUI 500(1) further includes a search field 506 and entity icons 509(1)-509(n) (generically referred to as entity icons 509) on the sidebar 507. The information in the search field 506 and the information elements represented by the entity icons 509 may lack a timestamp and might not have a location either. As such, in contrast to "events", these information elements may be considered "entities".

The entities that may be represented by the entity icons 509 can include security cameras, access points, people, video conference cameras, building zones, parking lots, microphones, telephones and user notes, to name a few non-limiting possibilities. In the example of FIG. 5A, the entity icons 509 are collectively displayed on a single area on the GUI 500(1), such as the sidebar 507 on the top of the first portion 502. In other alternative examples, the entity icons 509 may be individually displayed in a different respective portion of the GUI 500(1). For example, actionable information elements representing entities may be displayed as respective icons within the map 504. Furthermore, the entity icons 509 may be collectively displayed in a portion that is different than the first portion 502.

The indicia associated with an entity characterized by an identifier can be the identifier itself. In some cases, the indicia associated with an entity can further include a location of the entity.

For example, in the case of an entity that is a specific camera characterized by a camera ID, the indicia may include the camera ID and a location of the specific camera (which would be known to the system). In the case of an entity that is the name of a specific person characterized by a badge ID, the indicia may include the name of the specific person, the specific person's badge ID and the specific person's access permissions.

As such, each event or entity is linked to indicia in the event/entity database 208A so that when the user 160 is detected as having selected an event or an entity, the associated indicia can be extracted from the event/entity database 208A and if further indicia are required, the user may be prompted to provide the missing indicia, as described earlier.

In some examples, the area of the GUI 500(1) where first user input is detected is located in the first portion 502 (e.g., the map 504, the search field 506, the alarm icon 508 or the entity icons 509) of the GUI 500(1). In other examples, the area of the GUI 500(1) where first user input is detected is located in another portion of the GUI 500(1) that is different than the first portion 502.

The first user input may consist of selecting an event (hereinafter referred to as an event-type user input). This can be achieved by selecting one of the icons 510(1)-510(n) on the map 504, any entry from a list, or the alarm icon 507 as shown in FIG. 5A.

The first user input may also consist of selecting an entity (hereinafter referred to as an entity-type user input). This may be achieved by selecting one of the entity icons 509 in the sidebar 507 or by entering information in the search field 506.

For example, the user 160 may wish to investigate a specific entity (for example, a specific security camera) by tapping or clicking an entity icon 509(n) on the side bar. The tapping or clicking gesture serves as the first user input and, in this case, is entity-type user input. Accordingly, once the "security camera" entity icon 509(n) is selected, a list of security cameras may be displayed, and the user 160 may tap or select a specific security camera of interest from the displayed list.

In this specific example, the user may wish to investigate a gate access event corresponding to the event icon 510(1) by tapping or clicking on the event icon 510(1) on the map 504. The tapping or clicking gesture serves as the first user input and, in this case, is event-type user input.

Figure 5B:
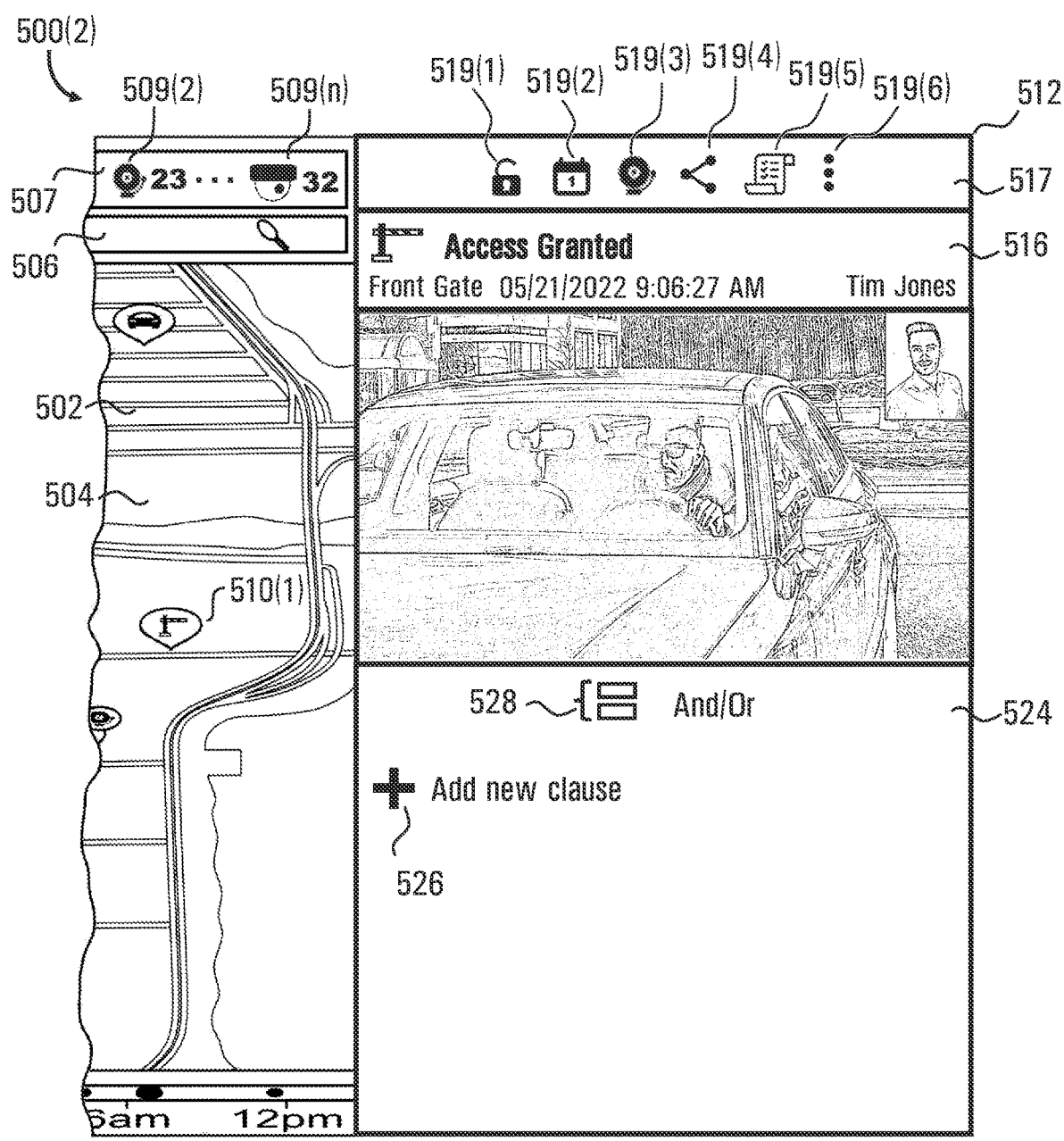
FIG. 5B illustrates an exemplary user interface generated after receiving user input selecting an event indicator in an area of the user interface of FIG. 5A, in accordance with one embodiment.

FIG. 5B shows an example second portion 512 of the GUI 500(2) that can be generated by the electronic device 112 in response to the user 160 having made the previously described selection of the event icon 510(1) within the GUI 500(1). In the example of FIG. 5B, the generated second portion 512 is adjacent the first portion 502 on the GUI 500(2). That is, the second portion 512 takes the form of a pane that is displayed concurrently with the map 504 in the first portion 502 of the GUI 500(2).

FIG. 5B shows that the second portion 512 provides "primary information" 516 associated with the gate access event corresponding to the event icon 510(1). The primary information 516 provides information pertaining to the selected event that is expected to be of interest or relevance to the user 160. As the event icon 510(1) is determined to be a gate access event at the front gate, from the perspective of security management, the interesting or relevant information associated with the gate access event might be information indicating whether access was granted, gate ID information indicating the gate that was accessed (i.e., the front gate in this example), the time at which the access occurred, the name and/or other identifier of the person and/or vehicle that accessed the gate (i.e., the name "Tim Jones" in this example) and footage captured by a security camera in the vicinity of the location of the front gate. Such primary information displayed at the user's fingertips may help answer the user's intuitive questions regarding the selected event and may assist the user in identifying whether or not the event is an abnormal situation.

In the example of FIG. 5B, the second portion 512 of the GUI 500(2) also includes a sidebar 517. In this example, the sidebar 517 includes a number of action icons 519(1)-519(6) corresponding to actions that the user can initiate with respect to the selected gate access event. Here it is noted that the action icon 519(6) is a "more action" icon that is selectable by the user to view further action icons beyond those shown in the limited space provided on sidebar 517.

In this specific example, the gate access event resulted in access being granted to the employee Tim Jones and although the event occurred outside of normal work hours it was not identified as an abnormal situation by the security system. An operator reviewing the gate access event may wish to configure a rule for identifying occurrences of such a situation and to associate different workflows that may be triggered when such a situation is detected going forward. However, as discussed earlier, rule creation processes in conventional security monitoring platforms are cumbersome and tedious, and therefore may be difficult for the user to identify and articulate such a rule based on the selected event in a conventional security monitoring platform.

Aspects of the present disclosure provide computer-implemented mechanisms that facilitate the creation and refinement of rules to identify occurrences of situations by leveraging the collection and exposure of context data to the user as part of the rule creation process. For example, in accordance with an embodiment of the present disclosure, the action icon 519(5) in the sidebar 517 corresponds to a rule definition action and is selectable by the user to initiate a rule definition method in accordance with the rule definition method 300 described earlier with reference to FIG. 3. For example, clicking or tapping the action icon 519(5) causes rule definition tools 526 and 528 to be exposed in another sidebar 524 on the second portion 512 of the GUI 500(2). The first rule definition tool 526 allows new clauses or conditions to be added to a rule for identifying a situation. The second rule definition tool 528 allows two or more conditions to be logically grouped.

In this case, the electronic device 112 recognizes that the gate access event icon 510(1) has been selected. As such, the electronic device 112 consults the event/entity database 208A to obtain indicia associated with the gate access event corresponding to the event icon 510(1). In this particular case, let it be assumed that the indicia associated with the selected event includes (i) timestamp data indicating the time at which the event occurred and (ii) location data indicating a location of the event.

In this specific example, clicking or tapping the first rule definition tool 526 causes a menu 530 to be exposed. An example of the dropdown menu 530 is shown in FIG. 6A. The menu 530 may be displayed on the sidebar 524 in the second portion 512 of the GUI 500(2). In other alternative examples, the menu 530 may be displayed in a different portion of the GUI 500(2). Furthermore, the menu 530 may be displayed in a portion that is different than the second portion 512. For example, the menu 530 may be displayed as an overlay within the map 504 in the first portion 502 of the GUI 500(2).

In the example shown in FIG. 6A, the menu 530 exposes a plurality of condition-related user-selectable user interface elements that each correspond to one or more conditions based on contextual information for the gate access event that was retrieved based on the initial indicia associated with the selected event. More specifically, in this example, the exposed plurality of condition-related user-selectable user interface elements includes several condition category-related user-selectable user interface elements that each corresponds to a respective category of conditions. For example, in the specific example shown in FIG. 6A, a timeframe category-related user-selectable user interface element 532(1) has been selected and, in response to its selection, a group of timeframe condition-related user-selectable user interface elements 536(1) corresponding to respective timeframe conditions within the timeframe category are exposed in a secondary menu 534(1). In this case, the exposed timeframe condition-related user-selectable user interface elements 536(1) are based on the timestamp of the gate access event, which is Saturday May 21, 2022 at 9:06:27 AM, and provide the user with the ability to refine the definition of the timeframe to which the rule will be applicable. Here it is noted that refining the timeframe condition by selecting one of the timeframe condition-related user-selectable user interface elements 536(1) may change the plurality of condition category-related user-selectable user interface elements that are exposed in the menu 530 and/or change the respective condition-related user-selectable user interface element(s) contained therein, because refining the timeframe condition (e.g., by selecting the "Holiday" option as shown in FIG. 6A) changes the time-related indicia that is used to retrieve contextual information. Accordingly, because the condition category-related user-selectable user interface elements that are exposed in the menu 530 are based on the contextual information that is retrieved from one or more of the information sources 104, and the contextual information is retrieved based on the indicia, changing the time-related indicia may change the condition category-related user-selectable user interface elements that are exposed in the menu 530.

As shown in FIG. 6B, after having selected the "Holiday" timeframe condition from among the timeframe condition-related user-selectable user interface elements 536(1), which generated a first condition 538(1) for the rule, the user has opted to add a new clause to the rule by clicking or tapping the first rule definition tool 526 and has also used a first logic-related user-selectable user interface element 527(1) to define a logical "AND" operation between the first condition 538(1) and the subsequent second condition the user is in the process of defining. The first logic-related user-selectable user interface element 527(1) may be exposed to the user responsive to detecting the user's clicking or tapping of the first rule definition tool 526. In this specific example, a location category-related user-selectable user interface element 532(2) has been selected and, in response to its selection, a group of location condition-related user-selectable user interface elements 536(2) corresponding to respective location conditions within the location category are exposed in a secondary menu 534(2). In this case, the exposed location condition-related user-selectable user interface elements 536(2) are based on the location data associated with the gate access event, which in this case indicates that the access event occurred at the front gate of the headquarters (HQ) parking lot, and provide the user with the ability to refine the definition of the region to which the rule will be applicable. Here it is noted that refining the location condition by selecting one of the location condition-related user-selectable user interface elements 536(2) may change the plurality of condition category-related user-selectable user interface elements that are exposed in the menu 530 and/or change the respective condition-related user-selectable user interface element(s) contained therein for the reasons discussed above with respect to refinement of the timeframe condition. As shown in FIG. 6B, in this specific example the user has refined the location condition by selecting the "Parking Lot" option.

As shown in FIG. 6C, after having selected the "Parking Lot" location condition from among the location condition-related user-selectable user interface elements 536(2), which generated a second condition 538(2) for the rule, the user has opted to add a new clause to the rule by clicking or tapping the first rule definition tool 526 and has also used a second logic-related user-selectable user interface element 527(2) to define a logical "AND" operation between the second condition 538(2) and the subsequent third condition the user is in the process of defining. The second logic-related user-selectable user interface element 527(2) may be exposed to the user responsive to detecting the user's clicking or tapping of the first rule definition tool 526. In this specific example, a direction-related user-selectable user interface element 532(3) has been selected. In particular, the direction condition associated with the direction-related user-selectable user interface element 532(3) is "Entering the parking".

As shown in FIG. 6D, after having selected the "Entering the parking" direction condition, which generated a third condition 538(3) for the rule, the user has opted to add a new clause to the rule by clicking or tapping the first rule definition tool 526 and has also used a third logic-related user-selectable user interface element 527(3) to define a logical "AND" operation between the third condition 538(1) and the subsequent fourth condition the user is in the process of defining. The third logic-related user-selectable user interface element 527(3) may be exposed to the user responsive to detecting the user's clicking or tapping of the first rule definition tool 526. In this specific example, a person properties category-related user-selectable user interface element 532(4) has been selected and, in response to its selection, a group of person properties condition-related user-selectable user interface elements 536(4) corresponding to respective person property conditions within the person properties category are exposed in a secondary menu 534(4). In this case, the exposed person properties condition-related user-selectable user interface elements 536(4) may be based on badge ID meta-data associated with the gate access event and on extracted meta-data that was extracted from video or image data collected during the gate access event, which in this case indicates that the access event involved the employee named Tim Jones and includes physical properties of the driver of the car captured in the video data shown in FIG. 5B. As shown in FIG. 6D, in this specific example the user has selected the "Employee" option from the group of person properties condition-related user-selectable user interface elements 536(4).

As shown in FIG. 6E, after having selected the "Employee" personal properties condition, which generated a fourth condition 538(4) for the rule, the user has opted to add a new clause to the rule by clicking or tapping the first rule definition tool 526 and has also used a fourth logic-related user-selectable user interface element 527(4) to define a logical "OR" operation between the fourth condition 538(4) and the subsequent fifth condition the user is in the process of defining. The fourth logic-related user-selectable user interface element 527(4) may be exposed to the user responsive to detecting the user's clicking or tapping of the first rule definition tool 526. In this specific example, the person properties category-related user-selectable user interface element 532(4) has again been selected and, in response to its selection, the group of person properties condition-related user-selectable user interface elements 536(4) are exposed in the secondary menu 534(4). As shown in FIG. 6E, in this specific example the user has selected the "Person" option from the group of person properties condition-related user-selectable user interface elements 536(4).

As shown in FIG. 6F, after having selected the "Person" personal properties condition, which generated a fifth condition 538(5) for the rule, the user is in the process of grouping the fourth condition 538(4) and the fifth condition 538(5) by selecting the check boxes 529 next to those conditions and clicking or tapping the second rule definition tool 528 as indicated at 531 in FIG. 6F.

As shown in FIG. 6G, after clicking or tapping the second rule definition tool 528 as indicated in FIG. 6F, the fourth condition 538(4) and the fifth condition 538(5) are logically grouped and a grouping icon 535 is exposed to indicate the grouping.

As shown in FIG. 6H, after having logically grouped the fourth condition 538(4) and the fifth condition 538(5), the user is in the process of grouping all five of the conditions 538(1)-538(5) by selecting the check boxes 529 next to those conditions and clicking or tapping the second rule definition tool 528 as indicated at 533 in FIG. 6H.

As shown in FIG. 6I, after clicking or tapping the second rule definition tool 528 as indicated in FIG. 6H, the five condition 538(1)-538(5) are logically grouped and a grouping icon 537 is exposed to indicate the grouping.

In some implementations, an actionable user interface element (not shown) that is actionable by the user to cause the rule to be stored may be exposed in the sidebar 524 or elsewhere in the user interface. The user interface may also expose one or more actionable user interface elements (not shown) that enable the user to assign a name or other identifier to the situation, which in this specific example may be "Invalid Parking Entry", as well as to allow the user to indicate one or more tags to be triggered when an occurrence of the situation is identified, each tag being associated with a respective subset of one or more actions to perform if the tag is triggered. In such implementations, storing the rule in the rule database 150 for use in monitoring for occurrences of the situation comprises storing the one or more tags in association with the rule such that identifying an occurrence of the situation based on the rule triggers the one or more tags associated with the rule.

As shown in FIG. 7, once the rule has been defined as described above, a visual summary of the rule may be exposed in the sidebar 524 or elsewhere in the GUI 500(3). In this specific example, as noted above the user has named the situation "Invalid Parking Entry" as indicated at 700, and has also indicated that workflows associated with the tags #InvalidEntry and #Abnormal are to be triggered when an occurrence of the situation is detected as indicated at 702. In addition, the user has also indicated that a workflow associated with the tag #EmployeeInvalidEntry is to be triggered when an occurrence of the situation is detected in which the "Employee" condition is met as indicated at 704(1). On the other hand, the user has also indicated that a workflow associated with the tag #StrangerInvalidEntry is to be triggered when an occurrence of the situation is detected in which the "Person" condition is met as indicated at 704(2).

Here it is noted that in the example discussed above with reference to FIGS. 6A-6I, the electronic device 112 has not provided an initial subset of one or more conditions as a basis for the rule based on an analysis of the contextual information that the electronic device 112 may have retrieved based on the initial indicia associated with the selected gate access event. However, in other cases such initial suggestions may be provided and the user then has the option of removing any of the initially suggested conditions in addition to the option of adding further conditions as discussed herein.

Figure 8A:
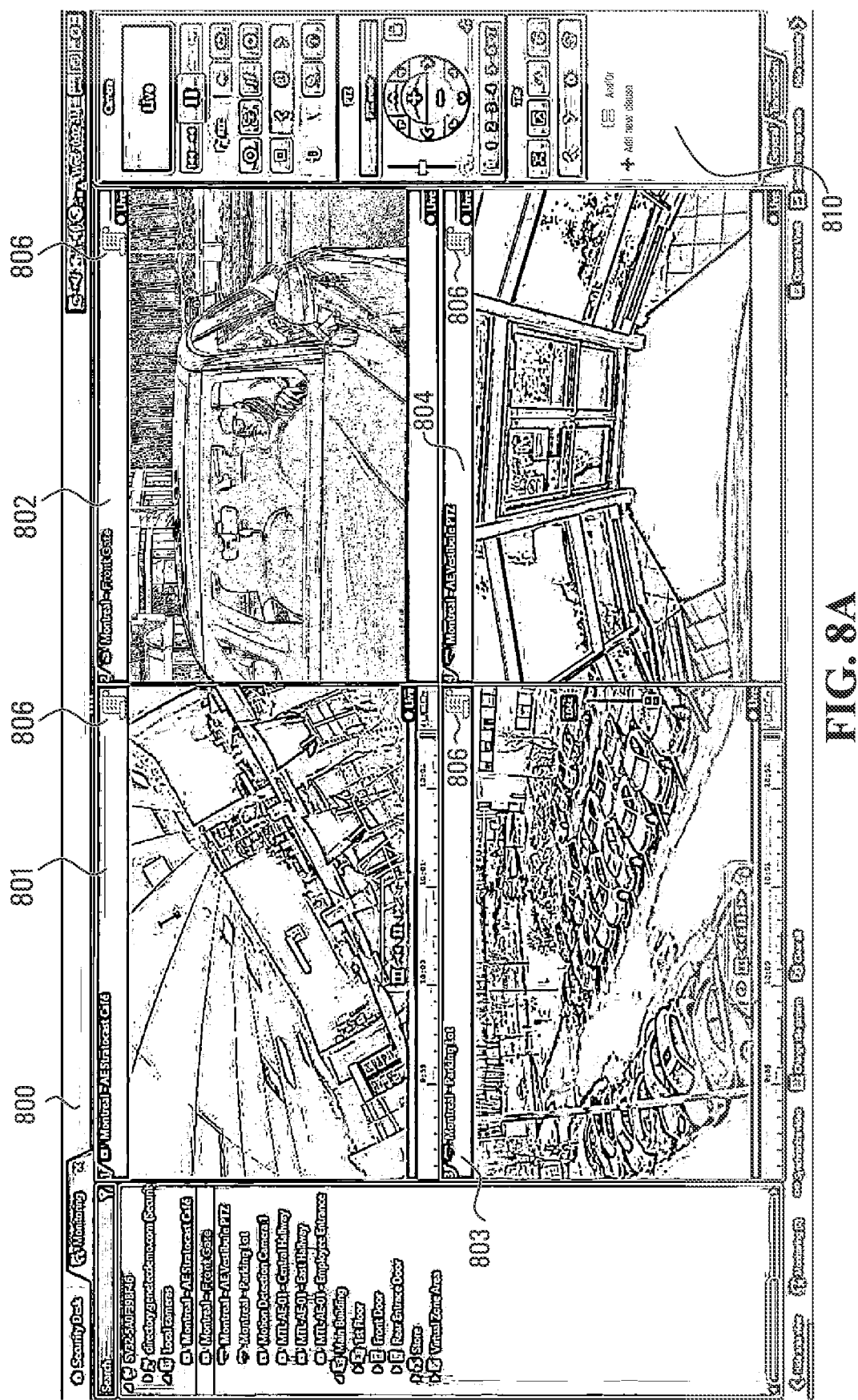
FIG. 8A illustrates an exemplary user interface of an electronic device of FIG. 1A or FIG. 1B, according to another embodiment of the present disclosure.
Figure 8B:
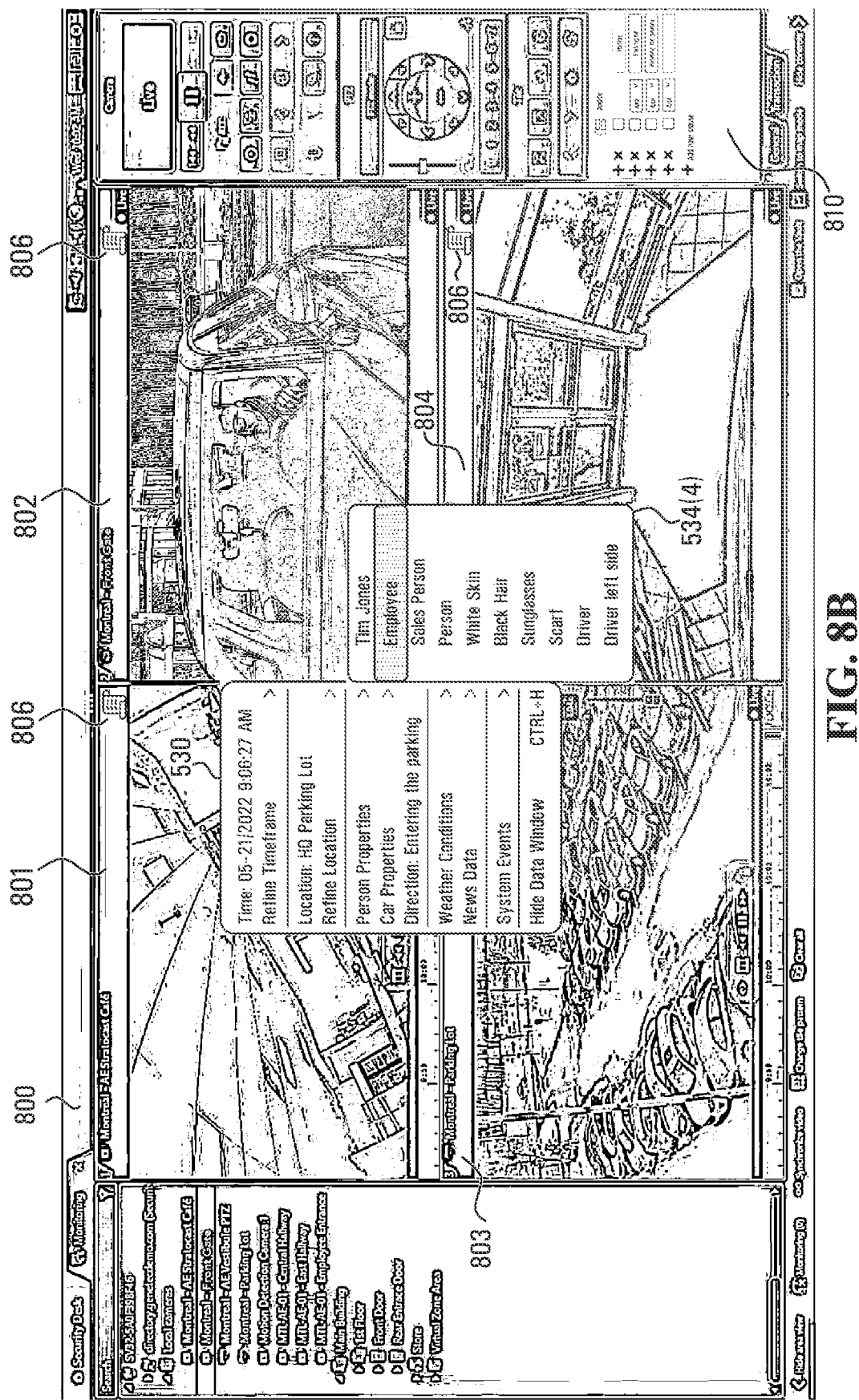
FIG. 8B illustrates an exemplary user interface generated after receiving user input in an area of the user interface of FIG. 8A to initiate definition of a rule for identifying an occurrence of a situation, in accordance with one embodiment.
Figure 9:
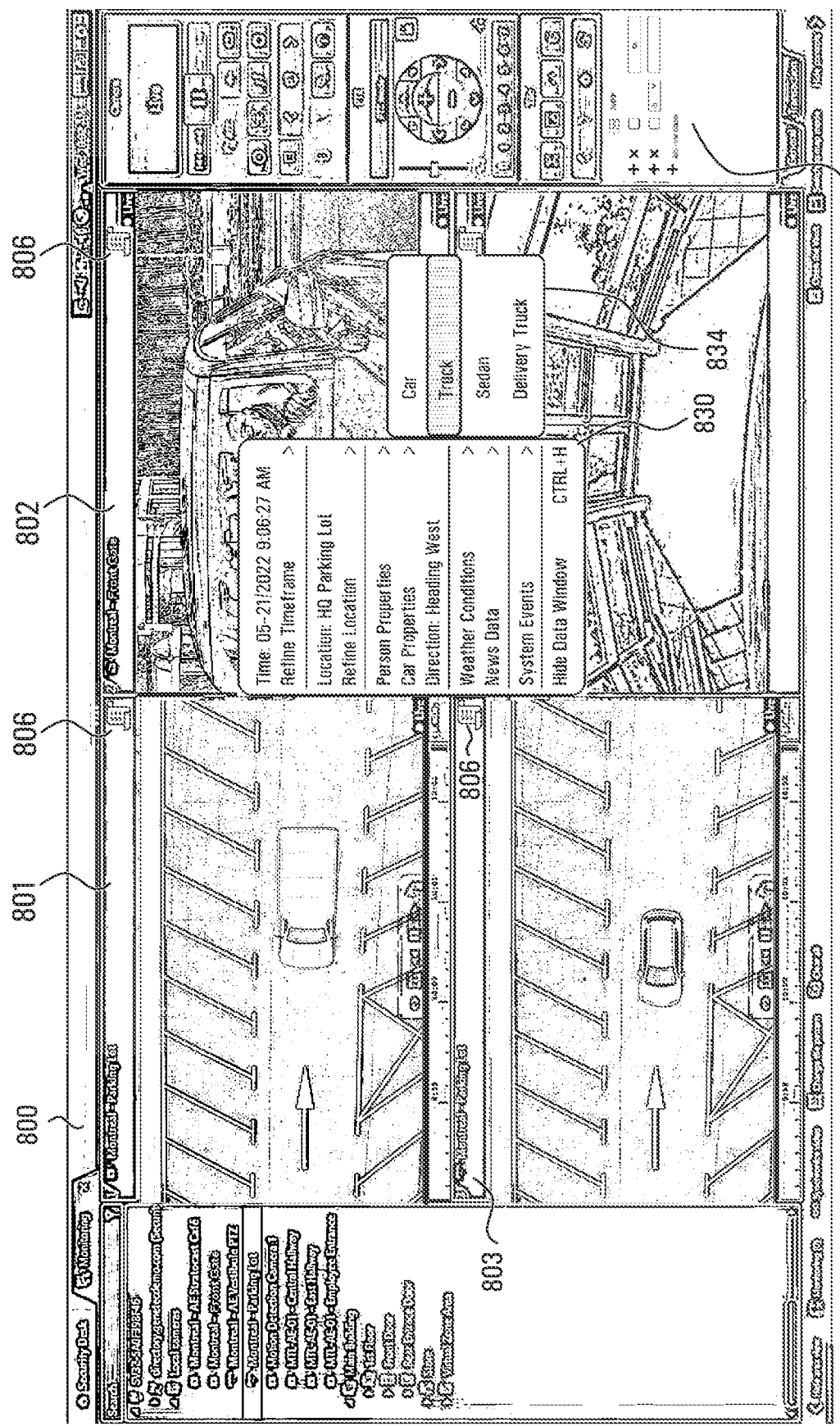
FIG. 9 illustrates an exemplary user interface of an electronic device of FIG. 1A or FIG. 1B, after receiving user input in an area of the user interface to initiate definition of a rule for identifying an occurrence of a situation, according to another embodiment of the present disclosure.
Figure 10:
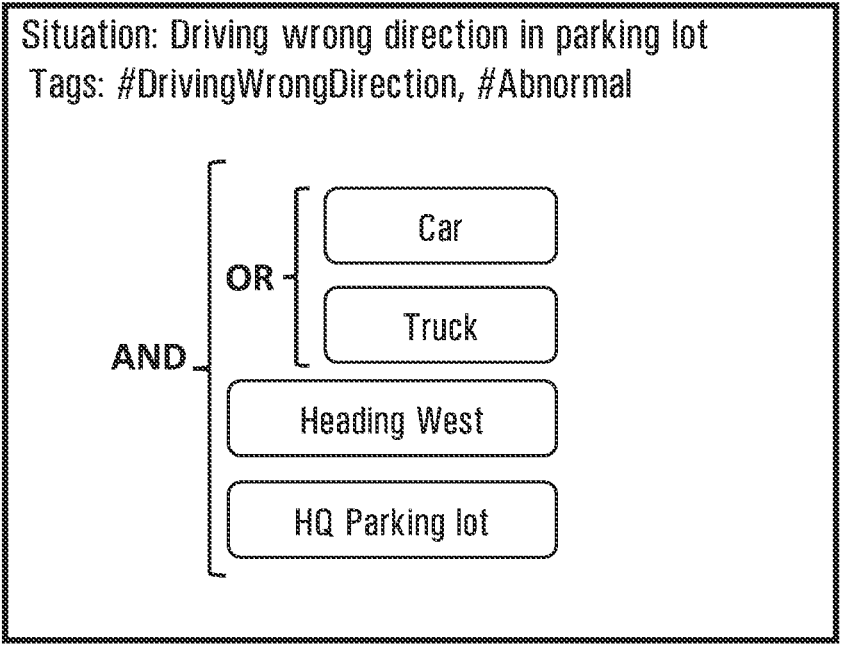
FIG. 10 illustrates an exemplary rule for identifying an abnormal situation defined using user-selectable user interface elements of the exemplary user interface of FIG. 9.

Example with Reference to FIGS. 8-10

It should be understood that the example implementation discussed above with reference to FIGS. 5-7 is merely one example and the context and/or basis upon which a user may initiate the definition of a rule for identifying an occurrence of a situation may be varied and differ in other implementations.

For example, FIG. 8A illustrates another context in which a user may initiate a rule definition process and interact with an electronic device 112 to define a rule for identifying occurrences of a situation in a security system. Compared to FIG. 5A, in which the GUI 500(1) included a first portion 502 with a map 504, FIG. 8A illustrates and example of a GUI 800 for a video management system (VMS) interface that includes multiple tiled video feeds. In this specific example there are four tiled video feeds 801, 802, 803 and 804 collected by different security cameras at various locations. In particular, it is noted that in this specific example the second tiled video feed 802 corresponds to security camera at the front gate involved in the gate access event described above with reference to FIGS. 5-7. In this specific example, each tiled video feed includes an instance of a rule definition action icon 806 that is selectable by the user to initiate a rule definition method in accordance with the rule definition method 300 described earlier with reference to FIG. 3. For example, clicking or tapping the action icon 806 in the second tiled video feed 802 may cause rule definition tools to be exposed in a sidebar 810 on the GUI 800 in order to facilitate the definition of a rule based on a situation observed in the second tiled video feed 802. For example, the rule definition tools may be those discussed above with reference to the examples shown in FIGS. 6A-6I, which allow new clauses or conditions to be added to a rule, allows two or more conditions to be logically grouped, and allow logical operators to be defined between conditions.

For example, FIG. 8B illustrates an example of the GUI 800 at a step in the rule definition process that generally corresponds to the step illustrated in FIG. 6E. In this specific example, the menu 530 and its secondary menu 534(4) are overlaid on the area of the GUI 800 in which the tiled video feeds are displayed.

As noted earlier, in some implementations the user may select multiple information sources, such as entities and/or events, as a basis for defining a rule. FIG. 9 illustrates an example of this in the context of the GUI 800 for a VMS interface that includes multiple tiled video feeds. In this specific example there are four tiled video feeds 801, 802, 803 and 804 collected by different security cameras at various locations. In this specific example, the first tiled video feed 801 and the third tiled video feed 803, which are displaying video data from the same security camera but at different times, have been selected as the basis for defining a rule to identify an occurrence of a situation. In particular, in this specific example, the first video feed shows a truck traveling the wrong direction in a parking lot and the third video feed similarly shows a car that is also traveling in the same wrong direction. In this case, based on an analysis of the respective subsets of contextual information retrieved based on the indicia associated with the two video feeds, the electronic device 112 includes both "Car" and "Truck" options in the group of car properties condition-related user-selectable user interface elements that are exposed in a secondary menu 834 when the car properties category-related user-selectable user interface element is selected in the menu 830. It is also noted that in this case the direction-related user-selectable user interface element in the menu 830 is "Heading West", which in this example based on the direction of travel of the truck and the car in the selected video feeds and is opposite to the normal direction of traffic in the parking lot. In this case, the user may utilize the rule definition mechanisms described herein to define a rule for detecting situations in which a vehicle is traveling in the wrong direction (i.e., heading west) in the parking lot. For example, the user may define a rule as follows: "(Car OR Truck) AND HQ Parking Lot AND Heading West" and attach workflows that are triggered when the situation is detected. For example, FIG. 10 illustrates a visual summary of such a rule, wherein the situation has been assigned the name or identifier "Driving wrong direction in parking lot" and has also indicated that workflows associated with the tags #DrivingWrongDirection and #Abnormal are to be triggered when an occurrence of the situation is detected In the example shown in FIGS. 8 and 9, each tiled video feed includes an instance of the rule definition icon 806. However, it should be understood that in other embodiments only a single rule definition icon 806 may be exposed to the user elsewhere in the user interface. In such implementations, the user may be prompted to select the video feed(s) upon which the rule is to be based (e.g., after clicking or tapping on the rule definition action, the user may be prompted to click on one or more of the video feeds). In addition or instead, the rule definition processes described herein may initiated without the use of an exposed rule definition icon. For example, in some implementations a rule definition process may be initiated by the user clicking or tapping on one or more of the tiled video feeds.

CONCLUSION

The present disclosure depicts methods and devices for use in a security monitoring platform or an investigation tool that allows a user to quickly configure rules for triggering workflows when a situation that warrants some action is observed. This setting up of the new rule is based on presenting in a GUI contextual data of the current situation and allowing the user to select (or deselect) this presented context data to indicate what is abnormal about the situation to setup the rule. Such a method of retrieving and exposing contextual information as user-selectable conditions to configure rules for identifying situations in a security monitoring platform may enable the user to configure more targeted and effective rules in a short time. What is more, as the contextual information is exposed to the user, navigation through a complex hierarchy of windows or reports may be avoided. Thus, operator training and/or hiring costs may be saved as well.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, certain technical solutions of the present disclosure may be embodied in the form of a software product. A suitable software product may be stored in a pre-recorded storage device or other similar non-volatile or non-transitory computer readable medium, for example. The software product includes instructions tangibly stored thereon that enable a processing device (e.g., a microprocessor) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

Although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A computer-implemented method for defining rules for identifying occurrences of situations in a security system, the method being performed at an electronic device with access to a user interface and comprising:
   obtaining indicia;
   accessing one or more information sources to retrieve contextual information based on the indicia;
   exposing, via the user interface, one or more condition-related user-selectable user interface elements, the one or more condition-related user-selectable user interface elements corresponding to one or more respective conditions based on the contextual information;
   after receiving, via the user interface, selection of a subset of the one or more condition-related user-selectable user interface elements, generating a rule for identifying occurrences of a situation based on the one or more respective conditions corresponding to the selected subset of the one or more condition-related user-selectable user interface elements; and storing the rule in a rule database for use in monitoring for occurrences of the situation.

2. The method of claim 1, wherein the indicia comprises time-related indicia and location-related indicia.

3. The method of claim 2, further comprising detecting user input in an area of the user interface, the user input indicating an occurrence of the situation, wherein obtaining the indicia comprises obtaining the indicia based on the user input.

4. The method of claim 3, wherein obtaining the indicia based on the user input comprises:
   identifying timestamp data associated with the user input;
   exposing, via the user interface, plural time-related user-selectable user interface elements based on the timestamp data associated with the user input, each time-related user-selectable user interface element corresponding to a different timeframe based on the timestamp data associated with the user input; and
   after receiving, via the user interface, selection of one of the time-related user-selectable user interface elements, assigning the timeframe corresponding to the selected one of the time-related user-selectable user interface elements as the time-related indicia.

5. The method of claim 4, wherein the timeframe corresponding to the selected one of the time-related user-selectable user interface elements is included as a condition in the rule for identifying occurrences of the situation.

6. The method of claim 4, wherein obtaining the indicia based on the user input further comprises:
   exposing, via the user interface, plural location-related user-selectable user interface elements, each location-related user-selectable user interface element corresponding to a different generalization of a region; and
   after receiving, via the user interface, selection of one of the location-related user-selectable user interface elements, assigning the region corresponding to the selected one of the location-related user-selectable user interface elements as the location-related indicia.

7. The method of claim 6, wherein the region corresponding to the selected one of the location-related user-selectable user interface elements is included as a condition in the rule for identifying occurrences of the situation.

8. The method of claim 3, wherein obtaining the indicia based on the user input comprises:
   identifying location data associated with the user input;
   exposing, via the user interface, plural location-related user-selectable user interface elements based on the location data associated with the user input, each location-related user-selectable user interface element corresponding to a different generalization of a region based on the location data associated with the user input; and
   after receiving, via the user interface, selection of one of the location-related user-selectable user interface elements, assigning the region corresponding to the selected one of the location-related user-selectable user interface elements as the location-related indicia.

9. The method of claim 8, wherein the region corresponding to the selected one of the location-related user-selectable user interface elements is included as a condition in the rule for identifying occurrences of the situation.

10. The method of claim 8, wherein obtaining the indicia based on the user input further comprises:
    exposing, via the user interface, plural time-related user-selectable user interface elements, each time-related user-selectable user interface element corresponding to a different timeframe; and
    after receiving, via the user interface, selection of one of the time-related user-selectable user interface elements, assigning the timeframe corresponding to the selected one of the time-related user-selectable user interface elements as the time-related indicia.

11. The method of claim 10, wherein the timeframe corresponding to the selected one of the time-related user-selectable user interface elements is included as a condition in the rule for identifying occurrences of the situation.

12. The method of claim 3, wherein the user input indicating the occurrence of the situation comprises one or more of selection, via the user interface, of one or more events and selection, via the user interface, of one or more entities.

13. The method of claim 12, wherein the one or more entities comprises at least one of a security camera, an access point, a person, a videoconference camera, a building zone, a parking lot, a microphone, a telephone, and a user note.

14. The method of claim 12, wherein the one or more events comprises at least one of an access granted event, a glass broken event, a license plate hit event, an unattended package event, and an interlock access denied event.

15. The method of claim 12, wherein the user input indicating the occurrence of the situation comprises plural selections via the user interface, the plural selections comprising one or more of: selections of at least two entities; selections of one entity at different times; selections of at least two events; and selections of at least one event and at least one entity.

16. The method of claim 15, wherein:
    obtaining indicia based on the user input comprises obtaining a respective subset of indicia for each selection of an entity or an event;
    accessing one or more information sources to retrieve contextual information based on the indicia comprises, for each respective subset of indicia, accessing one or more information sources to retrieve a respective subset of contextual information based on the respective subset of indicia; and
    exposing one or more condition-related user-selectable user interface elements comprises processing the respective subsets of contextual information to extract similarities in the respective subsets of contextual information, and exposing, via the user interface, at least one condition-related user-selectable user interface element corresponding to a condition based on one or more extracted similarities in the respective subsets of contextual information for two or more of the plural selections.

17. The method of claim 1, wherein the contextual information comprises meta-data extracted from data associated with at least one entity or event.

18. The method of claim 1, further comprising, exposing, via the user interface, logic-related user-selectable user interface elements, each logic-related user-selectable user interface element corresponding to a respective logical operation, the logic-related user-selectable user interface elements being selectable to define logical relations between conditions corresponding to the condition-related user-selectable user interface elements to define the rule for identifying occurrences of the situation.

19. The method of claim 18, wherein receiving selection of the subset of the one or more condition-related user-selectable user interface elements comprises receiving, via the user interface, selection of at least two of the one or more condition-related user-selectable user interface elements and selection of at least one of the logic-related user-selectable user interface elements to define the rule for identifying occurrences of the situation.

20. The method of claim 3, wherein;
detecting user input indicating an occurrence of a situation comprises detecting user input indicating a latest occurrence of a situation for which a pre-existing rule for identifying occurrences of the situation has been defined;
obtaining indicia based on the user input comprises obtaining indicia related to the latest occurrence of the situation;
accessing one or more information sources to retrieve contextual information based on the indicia comprises accessing one or more information sources to retrieve contextual information related to the latest occurrence of the situation based on the indicia; and
exposing one or more condition-related user-selectable user interface elements comprises exposing, via the user interface, one or more condition-related user-selectable user interface elements corresponding to respective conditions based on the contextual information related to the latest occurrence of the situation to facilitate refinement of the pre-existing rule for identifying occurrences of the situation.

21. The method of claim 1, wherein exposing one or more condition-related user-selectable user interface elements comprises:
exposing, via the user interface, one or more condition category-related user-selectable user interface elements, each condition category-related user-selectable user interface element corresponding to a respective category of conditions; and
after receiving, via the user interface, selection of one of the one or more condition category-related user-selectable user interface elements, exposing, via the user interface, one or more condition-related user-selectable user interface elements corresponding to respective conditions within the respective category of conditions corresponding to the selected one of the one or more condition category-related user-selectable user interface elements.

22. The method of claim 1, wherein accessing one or more information sources to retrieve contextual information based on the indicia comprises accessing plural information sources, the plural information sources comprising:
at least one information source internal to the security system to retrieve contextual information based on internal data collected in operation of the security system; and
at least one information source external to the security system to retrieve contextual information based on external data that is independent of operation of the security system.

23. The method of claim 22, wherein the at least one information source external to the security system comprises one or more of an information source providing weather condition information, an information source providing social media information, an information source providing news and current events information, and an information source providing traffic information.

24. The method of claim 1, further comprising:
receiving, via the user interface, an indication of one or more tags to be triggered when an occurrence of the situation is identified, each tag being associated with a respective subset of one or more actions to perform if the tag is triggered; and
wherein, storing the rule in the rule database for use in monitoring for occurrences of the situation comprises storing the one or more tags in association with the rule such that identifying an occurrence of the situation based on the rule triggers the one or more tags associated with the rule.

25. The method of claim 24, wherein, for at least one of the one or more tags, the respective subset of one or more actions to perform if the tag is triggered includes one or more of raising an alarm and sending a notification.

26. The method of claim 24, further comprising:
receiving, via the user interface, an indication of one or more tags to be triggered when a specific condition included in the definition of the rule for identifying an occurrence of the situation is present when an occurrence of the situation is identified, each tag to be triggered when the specific condition is present being associated with a respective subset of one or more actions to perform if the tag is triggered,
wherein, storing the rule in the rule database for use in monitoring for occurrences of the situation comprises storing the one or more tags in association with the specific condition included in the definition of the rule such that identifying an occurrence of the situation in which the specific condition is present based on the rule triggers the one or more tags associated with the specific condition.

27. The method of claim 1, wherein the situation is a first situation, the method further comprising:
identifying an occurrence of a similar second situation having some but less than all conditions in common with the rule defined for identifying occurrences of the first situation; and
in response to identifying the occurrence of the similar second situation, exposing, via the user interface, the occurrence of the similar second situation.

28. The method of claim 1, further comprising:
identifying an occurrence of the situation based on the rule stored in the rule database; and
in response to identifying the occurrence of the situation, triggering one or more actions.

29. The method of claim 28, wherein identifying an occurrence of the situation based on the rule stored in the rule database comprises:
applying the rule stored in the rule database to live video data from at least one camera to determine whether the rule for identifying an occurrence of the situation has been met; and
identifying the occurrence of the situation based on a result of applying the rule to the live video data.

30. The method of claim 29, wherein applying the rule to the live video data comprises:
accessing meta-data from the live video data, wherein the meta-data corresponds to at least one of the one or more respective conditions on which the rule for identifying occurrences of the situation is based; and
applying the rule to the meta-data to determine whether the rule for identifying an occurrence of the situation has been met.

31. A device, comprising:
a user interface;
one or more processors;
memory; and
one or more programs for defining rules for identifying occurrences of situations in a security system, wherein the one or more programs are stored in the memory and configured to be executed by the one or more processors, the one or more programs including:
instructions for obtaining indicia;
instructions for accessing one or more information sources to retrieve contextual information based on the indicia;
instructions for exposing, via the user interface, one or more condition-related user-selectable user interface elements, the one or more condition-related user-selectable user interface elements corresponding to one or more respective conditions based on the contextual information;
instructions for, after receiving, via the user interface, selection of a subset of the one or more condition-related user-selectable user interface elements, generating a rule for identifying occurrences of a situation based on the one or more respective conditions corresponding to the selected subset of the one or more condition-related user-selectable user interface elements; and
instructions for storing the rule in a rule database for use in monitoring for occurrences of the situation.

32. A non-transitory computer readable storage medium having stored therein instructions for defining rules for identifying occurrences of situations in a security system, which when executed by a device having access to a user interface, cause the device to:
obtain indicia;
access one or more information sources to retrieve contextual information based on the indicia;
expose, via the user interface, one or more condition-related user-selectable user interface elements, the one or more condition-related user-selectable user interface elements corresponding to one or more respective conditions based on the contextual information;
after receiving, via the user interface, selection of a subset of the one or more condition-related user-selectable user interface elements, generate a rule for identifying occurrences of a situation based on the one or more respective conditions corresponding to the selected subset of the one or more condition-related user-selectable user interface elements; and
store the rule in a rule database for use in monitoring for occurrences of the situation.

33. The device of claim 31, wherein the indicia comprises time-related indicia and location-related indicia.

34. The device of claim 33, wherein the one or more programs further include instructions for detecting user input in an area of the user interface, the user input indicating an occurrence of the situation, wherein the instructions for obtaining the indicia comprises instructions for obtaining the indicia based on the user input.

35. The device of claim 34, wherein the instructions for obtaining the indicia based on the user input comprise:
instructions for identifying timestamp data associated with the user input;
instructions for exposing, via the user interface, plural time-related user-selectable user interface elements based on the timestamp data associated with the user input, each time-related user-selectable user interface element corresponding to a different timeframe based on the timestamp data associated with the user input; and
instructions for, after receiving, via the user interface, selection of one of the time-related user-selectable user interface elements, assigning the timeframe corresponding to the selected one of the time-related user-selectable user interface elements as the time-related indicia.

36. The device of claim 35, wherein the instructions for obtaining the indicia based on the user input further comprise:
instructions for exposing, via the user interface, plural location-related user-selectable user interface elements, each location-related user-selectable user interface element corresponding to a different generalization of a region; and
instructions for, after receiving, via the user interface, selection of one of the location-related user-selectable user interface elements, assigning the region corresponding to the selected one of the location-related user-selectable user interface elements as the location-related indicia.

37. The device of claim 34, wherein the instructions for obtaining the indicia based on the user input comprise:
instructions for identifying location data associated with the user input;
instructions for exposing, via the user interface, plural location-related user-selectable user interface elements based on the location data associated with the user input, each location-related user-selectable user interface element corresponding to a different generalization of a region based on the location data associated with the user input; and
instructions for, after receiving, via the user interface, selection of one of the location-related user-selectable user interface elements, assigning the region corresponding to the selected one of the location-related user-selectable user interface elements as the location-related indicia.

38. The device of claim 37, wherein the instructions for obtaining the indicia based on the user input further comprise:
instructions for exposing, via the user interface, plural time-related user-selectable user interface elements, each time-related user-selectable user interface element corresponding to a different timeframe; and
instructions for, after receiving, via the user interface, selection of one of the time-related user-selectable user interface elements, assigning the timeframe corresponding to the selected one of the time-related user-selectable user interface elements as the time-related indicia.

39. The device of claim 34, wherein the user input indicating the occurrence of the situation comprises one or more of selection, via the user interface, of one or more events and selection, via the user interface, of one or more entities.

40. The device of claim 39, wherein the user input indicating the occurrence of the situation comprises plural selections via the user interface, the plural selections comprising one or more of: selections of at least two entities; selections of one entity at different times; selections of at least two events; and selections of at least one event and at least one entity.

45

41. The device of claim 40, wherein;
the instructions for obtaining indicia based on the user input comprise instructions for obtaining a respective subset of indicia for each selection of an entity or an event;
the instructions for accessing one or more information sources to retrieve contextual information based on the indicia comprise instructions for, for each respective subset of indicia, accessing one or more information sources to retrieve a respective subset of contextual information based on the respective subset of indicia; and
the instructions for exposing one or more condition-related user-selectable user interface elements comprise instructions for processing the respective subsets of contextual information to extract similarities in the respective subsets of contextual information, and instructions for exposing, via the user interface, at least one condition-related user-selectable user interface element corresponding to a condition based on one or more extracted similarities in the respective subsets of contextual information for two or more of the plural selections.

42. The device of claim 31, wherein the contextual information comprises meta-data extracted from data associated with at least one entity or event.

43. The device of claim 31, wherein the one or more programs further include instructions for exposing, via the user interface, logic-related user-selectable user interface elements, each logic-related user-selectable user interface element corresponding to a respective logical operation, the logic-related user-selectable user interface elements being selectable to define logical relations between conditions corresponding to the condition-related user-selectable user interface elements to define the rule for identifying occurrences of the situation.

44. The device of claim 34, wherein:
the instructions for detecting user input indicating an occurrence of a situation comprise instructions for detecting user input indicating a latest occurrence of a situation for which a pre-existing rule for identifying occurrences of the situation has been defined;
the instructions for obtaining indicia based on the user input comprise instructions for obtaining indicia related to the latest occurrence of the situation;
the instructions for accessing one or more information sources to retrieve contextual information based on the indicia comprise instructions for accessing one or more information sources to retrieve contextual information related to the latest occurrence of the situation based on the indicia; and
the instructions for exposing one or more condition-related user-selectable user interface elements comprise instructions for exposing, via the user interface, one or more condition-related user-selectable user interface elements corresponding to respective conditions based on the contextual information related to the latest occurrence of the situation to facilitate refinement of the pre-existing rule for identifying occurrences of the situation.

45. The device of claim 31, wherein the instructions for accessing one or more information sources to retrieve contextual information based on the indicia comprise instructions for accessing plural information sources, the plural information sources comprising:

46 at least one information source internal to the security system to retrieve contextual information based on internal data collected in operation of the security system; and
at least one information source external to the security system to retrieve contextual information based on external data that is independent of operation of the security system.

46. The device of claim 31, wherein the one or more programs further include:
instructions for receiving, via the user interface, an indication of one or more tags to be triggered when an occurrence of the situation is identified, each tag being associated with a respective subset of one or more actions to perform if the tag is triggered; and
wherein, the instructions for storing the rule in the rule database for use in monitoring for occurrences of the situation comprise instructions for storing the one or more tags in association with the rule such that identifying an occurrence of the situation based on the rule triggers the one or more tags associated with the rule.

47. The device of claim 31, wherein the situation is a first situation, the one or more programs further including:
instructions for identifying an occurrence of a similar second situation having some but less than all conditions in common with the rule defined for identifying occurrences of the first situation; and
instructions for, in response to identifying the occurrence of the similar second situation, exposing, via the user interface, the occurrence of the similar second situation.

48. The device of claim 31, wherein the one or more programs further include:
instructions for identifying an occurrence of the situation based on the rule stored in the rule database; and
instructions for, in response to identifying the occurrence of the situation, triggering one or more actions.

49. The non-transitory computer readable storage medium of claim 32, wherein the indicia comprises time-related indicia and location-related indicia.

50. The non-transitory computer readable storage medium of claim 49, wherein the instructions further comprise instructions that when executed by the device cause the device to detect user input in an area of the user interface, the user input indicating an occurrence of the situation, wherein obtaining the indicia comprises obtaining the indicia based on the user input.

51. The non-transitory computer readable storage medium of claim 50, wherein the instructions that when executed by the device cause the device to obtain the indicia based on the user input comprise instructions that when executed by the device cause the device to:
identify timestamp data associated with the user input;
expose, via the user interface, plural time-related user-selectable user interface elements based on the timestamp data associated with the user input, each time-related user-selectable user interface element corresponding to a different timeframe based on the timestamp data associated with the user input; and
after receiving, via the user interface, selection of one of the time-related user-selectable user interface elements, assign the timeframe corresponding to the selected one of the time-related user-selectable user interface elements as the time-related indicia.

52. The non-transitory computer readable storage medium of claim 51, wherein the instructions that when executed by the device cause the device to obtain the indicia based on the user input further comprise instructions that when executed by the device cause the device to:
  expose, via the user interface, plural location-related user-selectable user interface elements, each location-related user-selectable user interface element corresponding to a different generalization of a region; and
  after receiving, via the user interface, selection of one of the location-related user-selectable user interface elements, assign the region corresponding to the selected one of the location-related user-selectable user interface elements as the location-related indicia.

53. The non-transitory computer readable storage medium of claim 50, wherein the instructions that when executed by the device cause the device to obtain the indicia based on the user input comprise instructions that when executed by the device cause the device to:
  identify location data associated with the user input;
  expose, via the user interface, plural location-related user-selectable user interface elements based on the location data associated with the user input, each location-related user-selectable user interface element corresponding to a different generalization of a region based on the location data associated with the user input; and
  after receiving, via the user interface, selection of one of the location-related user-selectable user interface elements, assign the region corresponding to the selected one of the location-related user-selectable user interface elements as the location-related indicia.

54. The non-transitory computer readable storage medium of claim 53, wherein the instructions that when executed by the device cause the device to obtain the indicia based on the user input further comprise instructions that when executed by the device cause the device to:
  expose, via the user interface, plural time-related user-selectable user interface elements, each time-related user-selectable user interface element corresponding to a different timeframe; and
  after receiving, via the user interface, selection of one of the time-related user-selectable user interface elements, assign the timeframe corresponding to the selected one of the time-related user-selectable user interface elements as the time-related indicia.

55. The non-transitory computer readable storage medium of claim 50, wherein the user input indicating the occurrence of the situation comprises one or more of selection, via the user interface, of one or more events and selection, via the user interface, of one or more entities.

56. The non-transitory computer readable storage medium of claim 55, wherein the user input indicating the occurrence of the situation comprises plural selections via the user interface, the plural selections comprising one or more of: selections of at least two entities; selections of one entity at different times; selections of at least two events; and selections of at least one event and at least one entity.

57. The non-transitory computer readable storage medium of claim 56, wherein:
  the instructions that when executed by the device cause the device to obtain indicia based on the user input comprise instructions that when executed by the device cause the device to obtain a respective subset of indicia for each selection of an entity or an event;
  the instructions that when executed by the device cause the device to access one or more information sources to retrieve contextual information based on the indicia comprise instructions that when executed by the device cause the device to, for each respective subset of indicia, access one or more information sources to retrieve a respective subset of contextual information based on the respective subset of indicia; and
  the instructions that when executed by the device cause the device to expose one or more condition-related user-selectable user interface elements comprise instructions that when executed by the device cause the device to process the respective subsets of contextual information to extract similarities in the respective subsets of contextual information, and expose, via the user interface, at least one condition-related user-selectable user interface element corresponding to a condition based on one or more extracted similarities in the respective subsets of contextual information for two or more of the plural selections.

58. The non-transitory computer readable storage medium of claim 32, wherein the contextual information comprises meta-data extracted from data associated with at least one entity or event.

59. The non-transitory computer readable storage medium of claim 32, the instructions further comprise instructions that when executed by the device cause the device to expose, via the user interface, logic-related user-selectable user interface elements, each logic-related user-selectable user interface element corresponding to a respective logical operation, the logic-related user-selectable user interface elements being selectable to define logical relations between conditions corresponding to the condition-related user-selectable user interface elements to define the rule for identifying occurrences of the situation.

60. The non-transitory computer readable storage medium of claim 50, wherein:
  the instructions that when executed by the device cause the device to detect user input indicating an occurrence of a situation comprise instructions that when executed by the device cause the device to detect user input indicating a latest occurrence of a situation for which a pre-existing rule for identifying occurrences of the situation has been defined;
  the instructions that when executed by the device cause the device to obtain indicia based on the user input comprise instructions that when executed by the device cause the device to obtain indicia related to the latest occurrence of the situation;
  the instructions that when executed by the device cause the device to access one or more information sources to retrieve contextual information based on the indicia comprise instructions that when executed by the device cause the device to access one or more information sources to retrieve contextual information related to the latest occurrence of the situation based on the indicia; and
  the instructions that when executed by the device cause the device to expose one or more condition-related user-selectable user interface elements comprise instructions that when executed by the device cause the device to expose, via the user interface, one or more condition-related user-selectable user interface elements corresponding to respective conditions based on the contextual information related to the latest occurrence of the situation to facilitate refinement of the pre-existing rule for identifying occurrences of the situation.

61. The non-transitory computer readable storage medium of claim 32, wherein the instructions that when executed by the device cause the device to access one or more information sources to retrieve contextual information based on the indicia comprise instructions that when executed by the device cause the device to access plural information sources, the plural information sources comprising:

at least one information source internal to the security system to retrieve contextual information based on internal data collected in operation of the security system; and at least one information source external to the security system to retrieve contextual information based on external data that is independent of operation of the security system.

62. The non-transitory computer readable storage medium of claim 32, wherein the instructions further comprise instructions that when executed by the device cause the device to:

receive, via the user interface, an indication of one or more tags to be triggered when an occurrence of the situation is identified, each tag being associated with a respective subset of one or more actions to perform if the tag is triggered; and wherein, the instructions that when executed by the device cause the device to store the rule in the rule database for use in monitoring for occurrences of the situation comprise instructions that when executed by the device cause the device to store the one or more tags in association with the rule such that identifying an occurrence of the situation based on the rule triggers the one or more tags associated with the rule.

63. The non-transitory computer readable storage medium of claim 32, wherein the situation is a first situation, and the instructions further comprise instructions that when executed by the device cause the device to:

identify an occurrence of a similar second situation having some but less than all conditions in common with the rule defined for identifying occurrences of the first situation; and in response to identifying the occurrence of the similar second situation, expose, via the user interface, the occurrence of the similar second situation.

64. The non-transitory computer readable storage medium of claim 32, wherein the instructions further comprise instructions that when executed by the device cause the device to:

identify an occurrence of the situation based on the rule stored in the rule database; and in response to identifying the occurrence of the situation, trigger one or more actions.

\* \* \* \* \*